US 8,644,172 B2

(12) United States Patent
Hinderthuer et al.

(10) Patent No.: US 8,644,172 B2
(45) Date of Patent: Feb. 4, 2014

(54) PLUGGABLE MODULE WITH INTEGRATED DATA ANALYSIS FUNCTION

(75) Inventors: Henning Hinderthuer, Finning (DE); Mirko Lawin, Meiningen (DE)

(73) Assignee: ADVA Optical Networking SE, Meiningen OT, Dreißigacker (DE)

( * ) Notice: Subject to any disclaimer, the term of this patent is extended or adjusted under 35 U.S.C. 154(b) by 511 days.

(21) Appl. No.: 12/334,057

(22) Filed: Dec. 12, 2008

(65) Prior Publication Data
US 2009/0161689 A1 Jun. 25, 2009

(30) Foreign Application Priority Data

Dec. 12, 2007 (EP) .................................... 07123047
May 20, 2008 (EP) .................................... 08156577

(51) Int. Cl.
*H04W 16/28* (2009.01)

(52) U.S. Cl.
USPC ............... 370/252; 370/241; 398/10; 398/17; 398/24; 398/33; 398/43

(58) Field of Classification Search
USPC ............. 398/9, 10, 16, 17, 20, 22–24, 33, 43; 370/241, 252
See application file for complete search history.

(56) References Cited

U.S. PATENT DOCUMENTS

| | | | |
|---|---|---|---|
| 2003/0210917 A1* | 11/2003 | Stewart et al. ................ | 398/209 |
| 2003/0215236 A1* | 11/2003 | Manifold ........................ | 398/79 |
| 2003/0218981 A1 | 11/2003 | Scholten | |
| 2004/0203289 A1 | 10/2004 | Ice et al. | |
| 2005/0086336 A1* | 4/2005 | Haber ............................ | 709/223 |
| 2005/0246618 A1* | 11/2005 | Tran et al. ..................... | 714/801 |
| 2005/0265329 A1 | 12/2005 | Havala et al. | |
| 2006/0002710 A1* | 1/2006 | Dybsetter et al. ............. | 398/135 |
| 2009/0317073 A1* | 12/2009 | Hotchkiss et al. ............. | 398/1 |

FOREIGN PATENT DOCUMENTS

| | | |
|---|---|---|
| WO | 03/084281 | 10/2003 |
| WO | WO 03084281 | 10/2003 |

OTHER PUBLICATIONS

Okamoto S. et al., "IP Backbone Network Utilizing Photonic Transport Network Technologies", Optical Networks Magazine, SPIE, Bellingham, WA, US, vol. 1, No. 1, Jan. 1, 2001, pp. 19-28.
Office Action dated Mar. 27, 2009 in corresponding European Patent Application 08156577.2.
Office Action dated Mar. 30, 2009 in corresponding European Patent Application 08171513.8.
Office Action dated Mar. 30, 2009 in corresponding European Patent Application 07150171.2.
Office Action dated Mar. 30, 2009 in corresponding European Patent Application 08171352.1.
Office Action dated Apr. 4, 2009 in corresponding European Patent Application 08171052.7.

(Continued)

*Primary Examiner* — Un C Cho
*Assistant Examiner* — Siming Liu
(74) *Attorney, Agent, or Firm* — F. Chau & Associates, LLC

(57) ABSTRACT

The invention relates to a network comprising at least one host device having an interface card connected to a backplane of said host device, wherein said interface card comprises at least one cage for receiving a pluggable module which performs a traffic management of data transported via at least one optical fiber connected to said pluggable module.

13 Claims, 32 Drawing Sheets

(56) References Cited

OTHER PUBLICATIONS

Office Action dated Apr. 6, 2009 in corresponding European Patent Application 08171206.9.

Office Action dated Apr. 6, 2009 in corresponding European Patent Application 08171376.0.

European Office Action dated Feb. 16, 2012.

* cited by examiner

State of the art

State of the art

State of the art

State of the art

Fig. 8
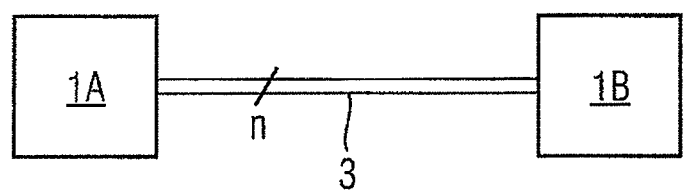
Fig. 9A                    Fig. 9B
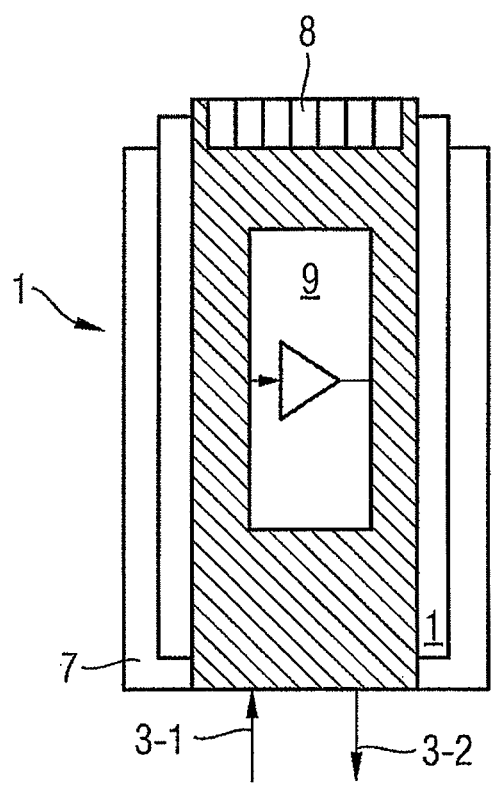 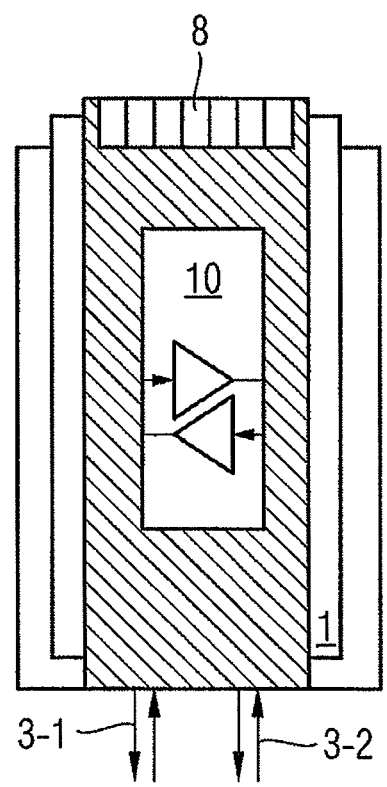

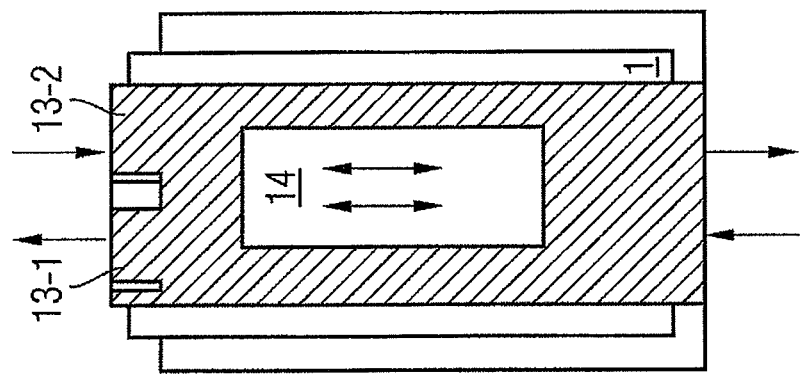
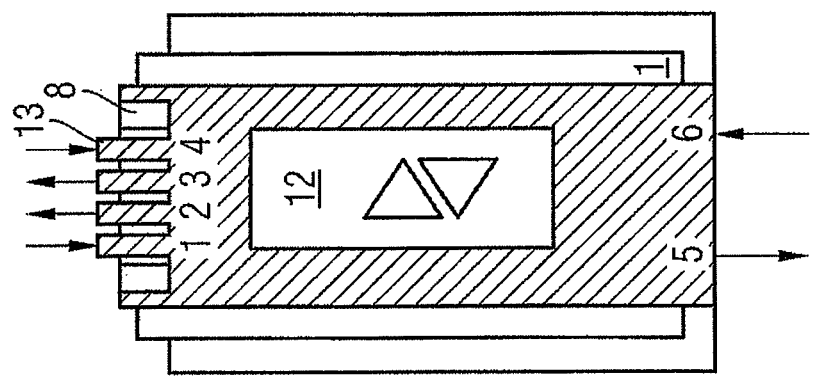
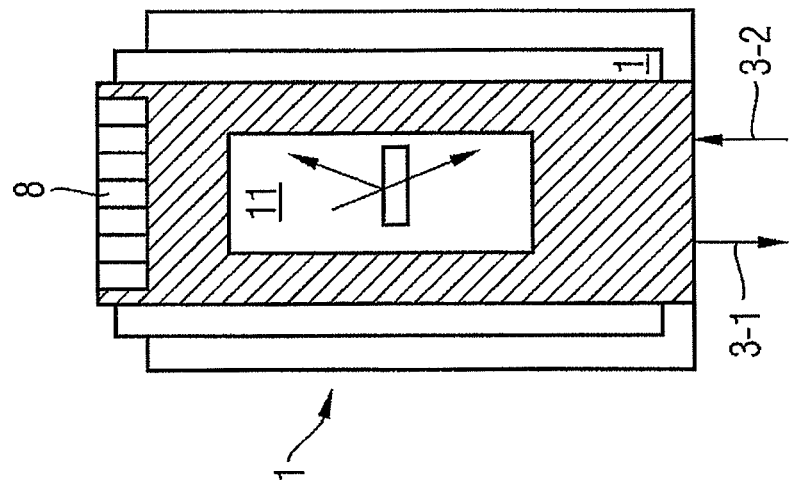

Fig. 9I
Fig. 9J
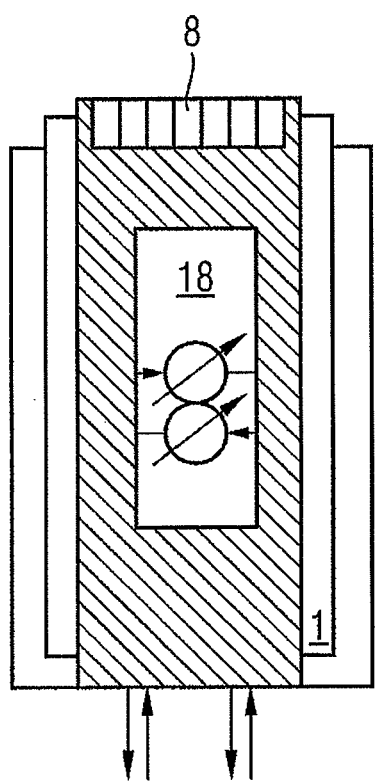
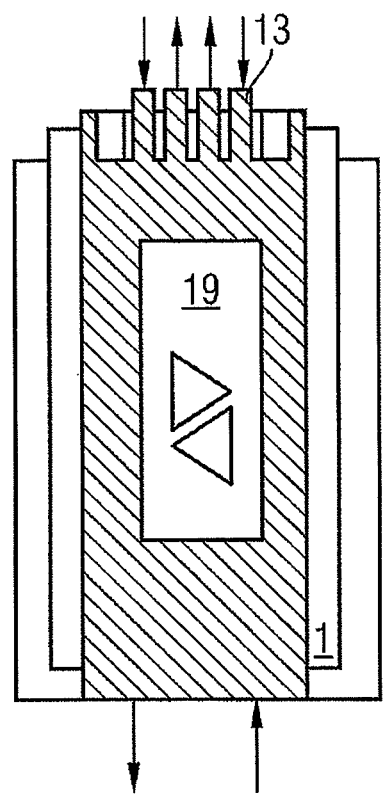

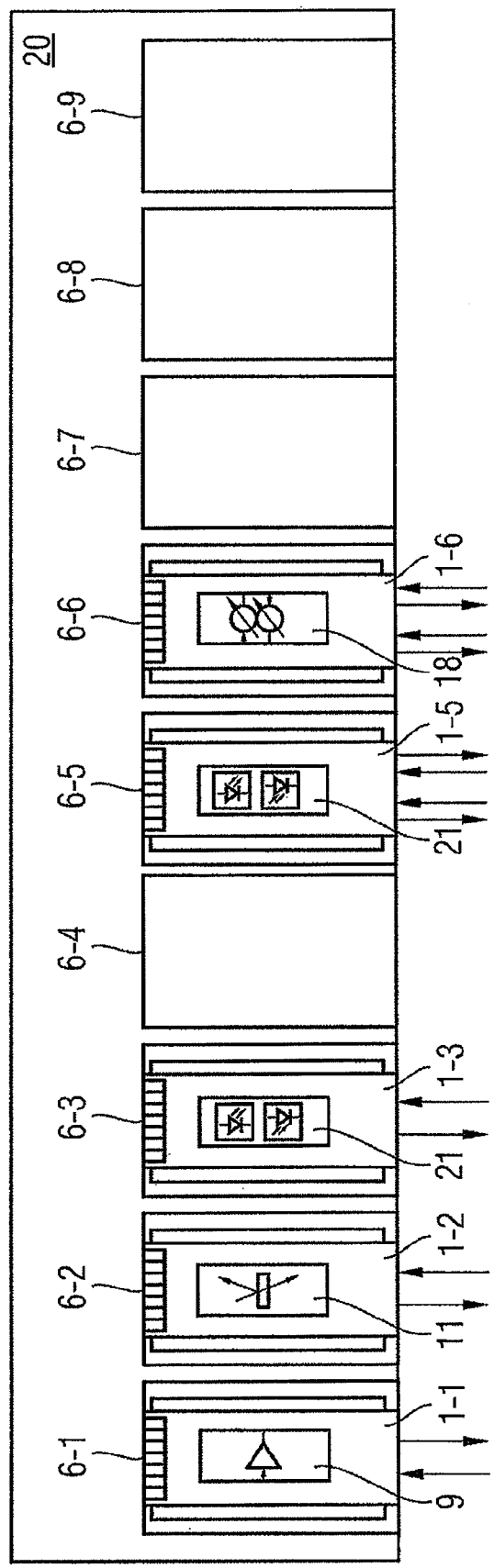

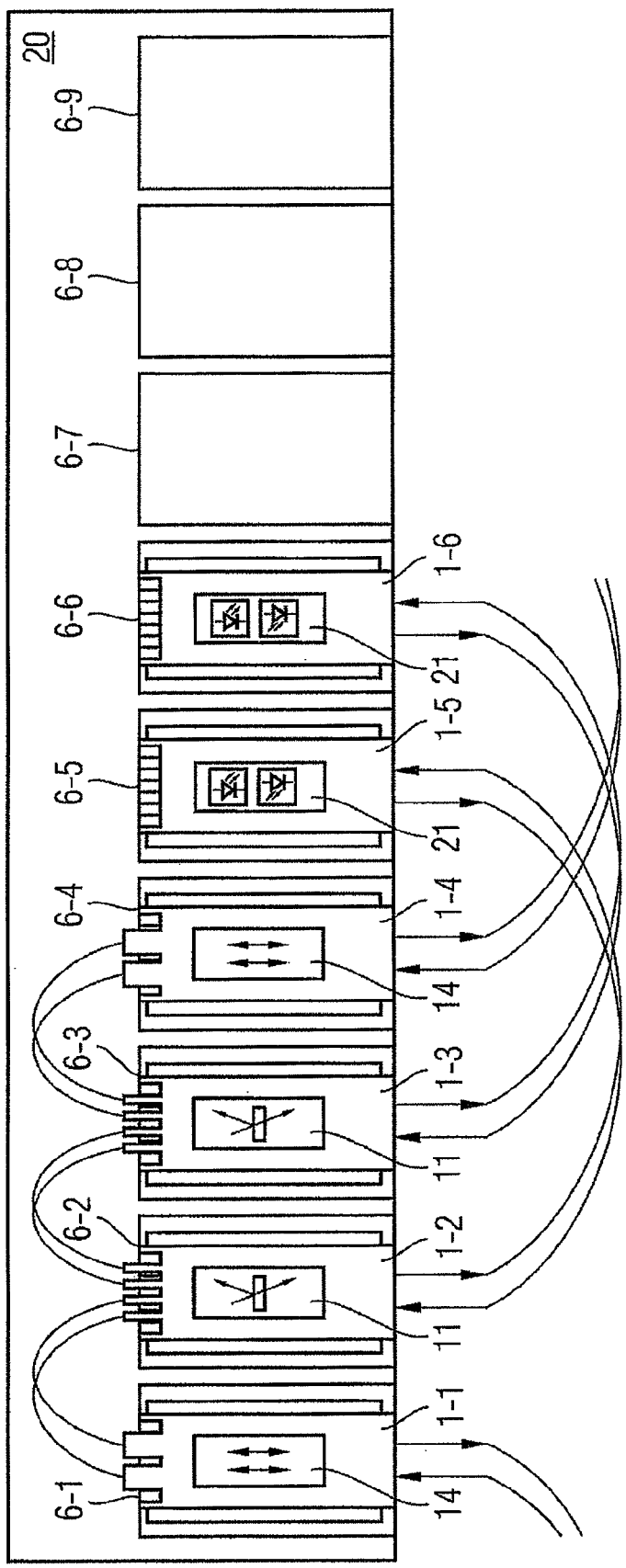

Fig. 15

| Byte | Bit | Name | Description |
|---|---|---|---|
| Converted analog values. Calibrated 16 bit data. | | | |
| 96 | All | Temperature MSB | Internally measured module temperature. |
| 97 | All | Temperature LSB | |
| 98 | All | Voc MSB | Internally measured supply voltage in transceiver. |
| 99 | All | Voc LSB | |
| 100 | All | TX Bias MSB | Internally measured TX Bias Current. |
| 101 | All | TX Bias LSB | |
| 102 | All | TX Power MSB | Measured TX output power. |
| 103 | All | TX Power LSB | |
| 104 | All | RX Power MSB | Measured RX input power. |
| 105 | All | RX Power LSB | |
| 106-109 | All | Unallocated | Reserved for future diagnostic definitions |
| Optional Status/Control Bits | | | |
| 110 | 7 | TX Disable State | Digital state of the TX Disable input Pin. Updated within 100 msec of change on pin. |
| | 6 | Soft TX Disable | Read/Write bit that allows software disable of laser. Writing '1' disables laser. See Table 3.11 for enable/ disable timing requirements. This bit is "OR'd with the hard TX_DISABLE pin value. Note per SFP MSA TX_DISABLE pin is default enabled unless pulled low by hardware. If Soft TX Disable is not implemented, the transceiver ignores the value of this bit. Default power up value is zero/low. |
| | 5 | RS(1) State | Reserved for digital state of input pin AS(1) per SFF-8079 and RS(1) per SFF-8431. Updated within 100msec of change on pin. |
| | 4 | Rate Select State | Digital state of the SFP Rate Select Input Pin. Updated within 100msec of change on pin. Note: This pin is also known as AS(0) in SFF-8079 and RS(0) in SFF-8431. |
| | 3 | Soft Rate Select | Read/write bit that allows software rate select control. Writing '1' selects full bandwidth operation. This bit is "OR'd with the hard Rate_Select AS(0) or RS(0) pin value. See Table 3.11 for timing requirements. Default at power up is logic zero/low. If Soft Rate Select is not implemented, the transceiver ignores the value of this bit. Note: Specific transceiver behaviors of this bit are identified in Table 3.6a and referenced documents. See Table 3.18a, byte 118, bit 3 for Soft RS(1) Select. |
| | 2 | TX Fault | Digital state of the TX Fault Output Pin. Updated within 100 msec of change on pin. |
| | 1 | LOS | Digital state of the LOS Output Pin. Updated within 100 msec of change on pin. |
| | 0 | Data_Ready_Bar | Indicates transceiver has archieved power up and data is ready. Bit remains high until data is ready to be read at which time the device sets the bit low. |
| 111 | 7-0 | Reserved | Reserved for SFF-8079. |

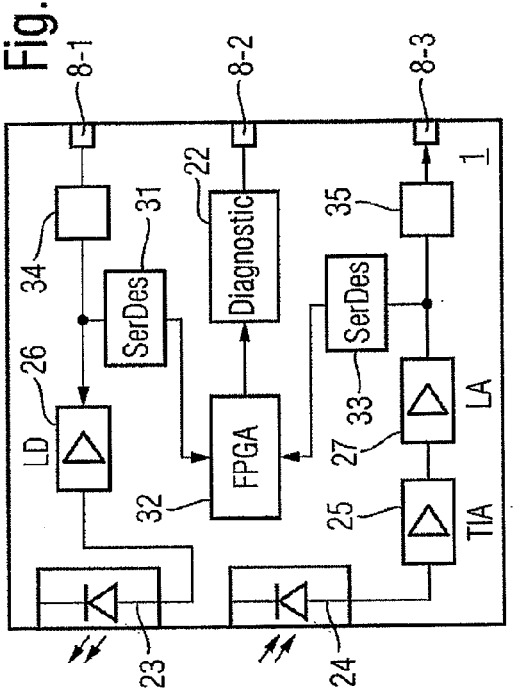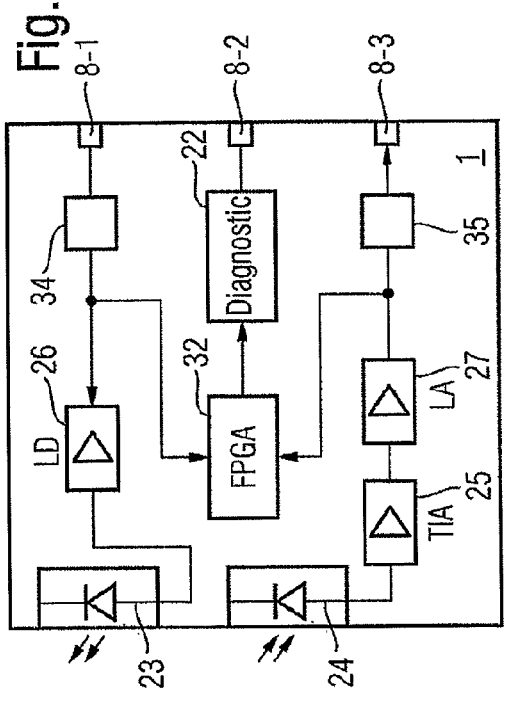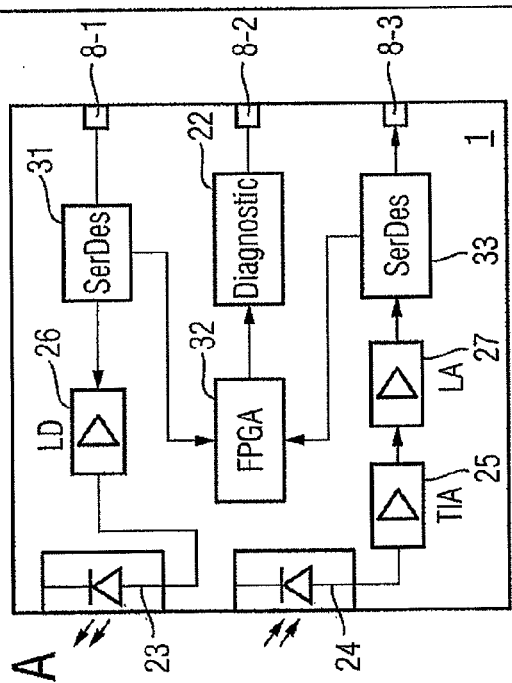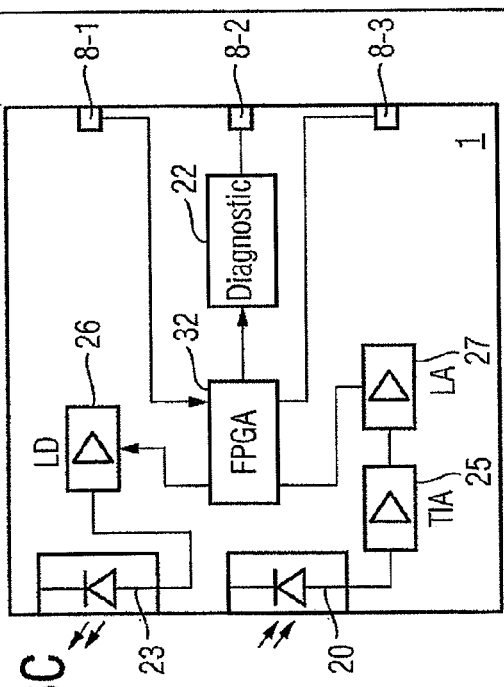

Fig. 17A

| Byte | Bit | Name | Description |
|---|---|---|---|
| Converted analog values. Calibrated 16 bit data. | | | |
| 96 | All | Temperature MSB | Internally measured module temperature. |
| 97 | All | Temperature LSB | |
| 98 | All | Voc MSB | Internally measured supply voltage in transceiver. |
| 99 | All | Voc LSB | |
| 100 | All | TX Bias MSB | Internally measured TX Bias Current. |
| 101 | All | TX Bias LSB | |
| 102 | All | TX Power MSB | Measured TX output power. |
| 103 | All | TX Power LSB | |
| 104 | All | RX Power MSB | Measured RX input power. |
| 105 | All | RX Power LSB | |
| 106-109 | All | Unallocated | Reserved for future diagnostic definitions |
| Optional Status/Control Bits | | | |
| 110 | 7 | TX Disable State | Digital state of the TX Disable input Pin. Updated within 100 msec of change on pin.  |
| | 6 | Soft TX Disable | Read/Write bit that allows software disable of laser. Writing '1' disables laser. See Table 3.11 for enable/ disable timing requirements. This bit is "OR'd with the hard TX_DISABLE pin value. Note per SFP MSA TX_DISABLE pin is default enabled unless pulled low by hardware. If Soft TX Disable is not implemented the transceiver ignores the value of this bit. Default power up value is zero/low. |
| | 5 | RS(1) State | Reserved for digital state of input pin AS(1) per SFF-8079 and RS(1) per SFF-8431. Updated within 100msec of change on pin. |
| | 4 | Rate Select State | Digital state of the SFP Rate Select Input Pin. Updated within 100msec of change on pin. Note: This pin is also known as AS(0) in SFF-8079 and RS(0) in SFF-8431. |
| | 3 | Soft Rate Select | Read/write bit that allows software rate select control. Writing '1' selects full bandwidth operation. This bit is "OR'd with the hard Rate_Select AS(0) or RS(0) pin value. See Table 3.11 for timing requirements. Default at power up is logic zero/ low. If Soft Rate Select is not implemented, the transceiver ignores the value of this bit. Note: Specific transceiver behaviors of this bit are identified in Table 3.6a and referenced documents. See Table 3.18a, byte 118, bit 3 for Soft RS(1) Select. |
| | 2 | TX Fault | Digital state of the TX Fault Output Pin. Updated within 100 msec of change on pin. |
| | 1 | LOS | Digital state of the LOS Output Pin. Updated within 100 msec of change on pin. |
| | 0 | Data_Ready_Bar | Indicates transceiver has archieved power up and data is ready. Bit remains high until data is ready to be read at which time the device sets the bit low. |
| 111 | 7-0 | Reserved | Reserved for SFF-8079. |

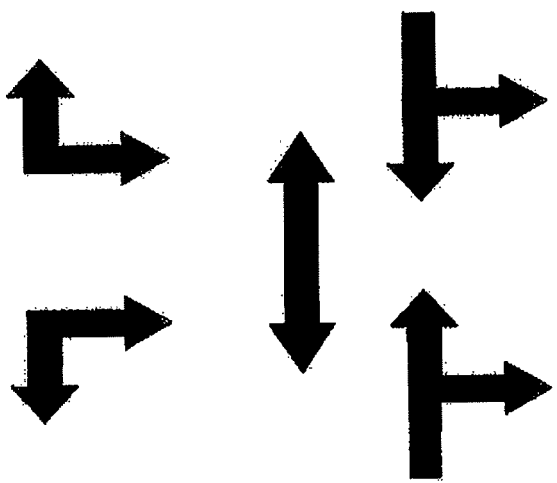

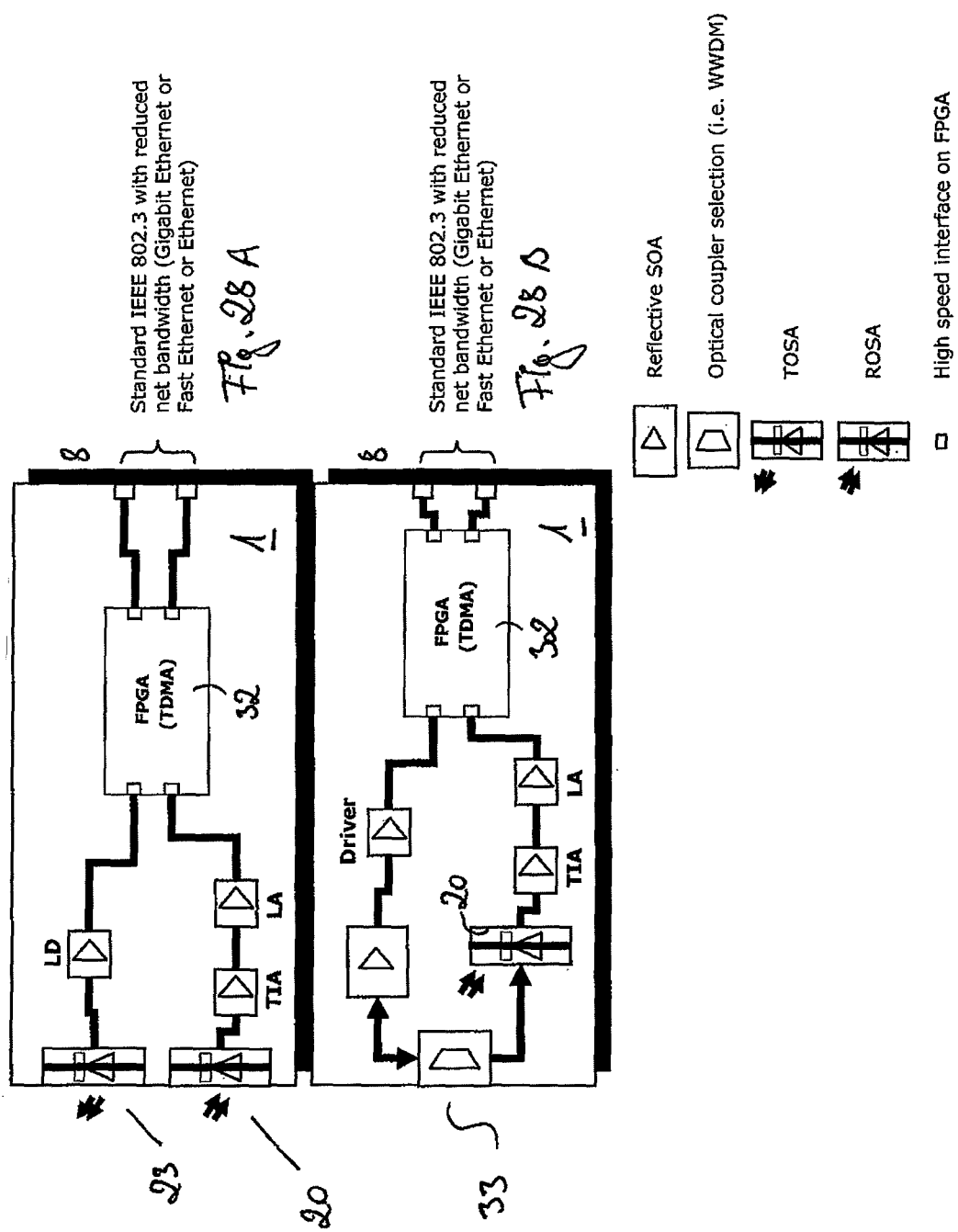

PLUGGABLE MODULE WITH INTEGRATED DATA ANALYSIS FUNCTION

The invention relates to a method and a system for transport of data and in particular to a pluggable module used in said system for bidirectional transport of data via at least one optical fibre between host devices, wherein said pluggable module comprises a digital data analysis function.

TECHNICAL BACKGROUND

FIG. 1 shows a conventional architecture of an optical network. The network architecture is hierarchical having the highest data rates in an optical core network, such as a backbone network of a country. To each core network several optical metro networks can be connected, for instance in a ring structure. To each metro network in turn several access networks can be connected. The edge of the network as shown in FIG. 1 is formed by terminal devices T which can be connected via xDSL (version of Digital Subscriber Line) to a host device, for example to a switch in an DSLAM (Digital Subscriber Line Access Multiplexer). This switch is connected via an optical transport system (designated as FSP in all figures) and optical transport means to a transport system of a local exchange. The core, metro and access network can have a ring structure, for example formed by two optical fibres and by transport systems. The optical fibres can transport data by means of wave length division multiplexing WDM. In wave length division multiplexing WDM optical carrier signals are multiplexed on a single optical fibre by using different wave lengths λ (colours) to carry different data signals. This allows an increased bandwidth and makes it possible to perform bidirectional communication over one strand of fibre. WDM-systems allow to expand the capacity of a network without laying more fibre. The capacity of an optical fibre can be expanded by upgrading multiplexers and demultiplexers at each end. This is often done by using optical-to-electrical-to-optical conversion at the edge of the transport network to permit interoperation with existing equipment. WDM-systems can be divided in different wave length patterns, i.e. conventional or coarse and dense WDM (CWDM, DWDM). A recent development relating course WDM is the creation of GBIC (Gigabit Interface Converter) and Small Form Factor Pluggable (SFP) transceivers using standardized CWDM-wave lengths.

As can be seen from FIG. 1, an optical network can be formed by two main components, i.e. by a transport system and by host devices. Host devices include switching devices, such as routers, bridges, Ethernet switches, fibre channel switches or cross-connects. The network architecture as shown in FIG. 1 comprises optical interconnections, optical transport systems and host devices, such as switches or routers. The separation of functionality in two different device types of the conventional network as shown in FIG. 1, i.e. on the one hand transport of data (by the transport system) and on the other hand aggregation/switching data (by the host devices) increases complexity and costs.

Accordingly, it has been proposed to shift functionality of the transport system, in particular the electrical-to-optical conversion, into the host device by using pluggable transceivers.

A small form factor pluggable (SFP) is a compact optical transceiver using optical communication. A conventional small form factor pluggable module interfaces a network device mother board of a host device, such as a switch or router to an optical fibre or unshielded twisted pair networking cable. The SFP-transceivers are available in a variety of different transmitter and receiver types allowing users to select an appropriate transceiver for each link to provide a required optical reach over the available optical fibre type.

A SFP-transceiver is specified by a multi-source agreement (MSA) between competing manufacturers. The SFP-module is designed after the GBIC-interface and allows greater data port density (i.e. number of transceivers per inch along the edge of a mother board) than GBIC. SFP-transceivers are commercially available and have a capability for data rates up to 4.25 Gbit/sec. A variant standard, XFP, is capable of 10 Gbit/sec.

Some SFP-transceivers support digital optical monitoring functions according to the industry standards SSF 8472 (ftp://ftp.seagate.com/sff/SFF-8472.PDF) multi-source agreement (MSA). This makes it possible for an end user to monitor real time parameters of the SFP-module, such as optical output power, optical input power, temperature, laser bias current and transceiver supply voltage.

FIGS. 2, 3 show a conventional pluggable standard SFP-transceiver module. The SFP pluggable module comprises an electrical interface connecting the pluggable module with a mother board of a host device by plugging the module into a cage of the host device board. On the front side of the pluggable module at least one optical fibre is attached to the module.

FIG. 4 shows a conventional system with pluggable SFP-transceivers. A host device, such as a switch or router, comprises a controller which is connected via a backplane to interface cards each having several cages which allow to plug in SFP-modules as shown in FIG. 3. A transceiver within the pluggable module performs a conversion of the applied electrical signals to an optical signal which is forwarded via an optical fibre to the transport system. The transport system comprises several cards which comprise several cages for plug-in SFP-transceiver modules. These interface cards allow a switching, i.e. multiplexing or demultiplexing of signals within the electrical domain in response to control signals generated by a controller of the transport system and received via an internal management connection. From the interface cards within the transport system the switched or controlled signals are applied to further modules for optical signals or optical fibres. These modules can, for example comprise variable optical attenuators (VOA), multiplexers/demultiplexers, amplifiers, switchers etc. From the transport system connected to the near end host device, the signals are forwarded via optical fibres to remote far end transport systems over a distance of many kilometers, wherein the remote transport systems are in turn connected to far end host devices.

The conventional system as shown in FIG. 4 as a the disadvantage that the complexity of the system is quite high because three domain conversions on the near end side and on the far end side have to be performed. As can be seen from FIG. 4, an electrical signal of the near end host device is converted within the pluggable SFP-transceivers plugged into the interface card of the host device to an optical signal and then retransformed from the optical domain to the electrical domain by a SFP-transceiver plugged into a cage of an interface card of the transport system. After an electrical switching is performed depending on the control signal supplied by the controller of the transport system, the electrical signal is again transformed from the electrical domain into an optical domain by another plugged in SFP-transceiver. Accordingly at the near end side, three domain conversions, i.e. an electrical-to-optical, an optical-to-electrical and an electrical-to-optical conversion are necessary. On the far end side, the three conversions are performed again resulting in a total of six domain conversions. Because of the necessary domain conversions, the technical complexity of the system is quite high. Since two different devices, i.e. a host device and a transport system have to be provided on each side management efforts, the occupied space and power consumption are increased.

Conventional MSA compatible transceivers provide only data transmission functions. Accordingly, conventional transceivers and MSA compatible transceivers which are provided within a pluggable module operate only on an optical layer. All other functions, such as management and data traffic analysis for data protocol analysis are either performed by the host devices or external separate devices.

To provide protocol based services by a network operator a bidirectional transmission of data to the client is necessary. Furthermore, monitoring of the performance of the respective service is necessary, since the transmission characteristics of the data transmission channel can be compromised and can affect the performance of the respective service negatively.

In a conventional network or system a monitoring of the service performance is done by means of active data transmission techniques at the location of the client during the measurement and evaluation of performance data, such as "loss of Ethernet frame". An additional data transmission channel is provided for transmitting the measured performance data at the location of the client to the location of the network operator. With this kind of active performance monitoring it can be checked whether the system complies with SLAs and a detailed error analysis can be performed in case of failures.

However, the active transmission technique as used in a conventional system to monitor the performance of a provided service has several disadvantages. A separate apparatus has to be provided and carried to the location of the client. Hence, there is a statistic probability that the active data transmission technique fails and the operational availability of the network is reduced. Furthermore, performance monitoring by means of an active data transmission technique at the side of the client is laborious and takes considerable efforts.

Accordingly, it is an object of the present invention to provide a method and a system to overcome the above mentioned problems and which provide a reliable and easy to handle monitoring of a service performance.

SUMMARY OF THE INVENTION

The invention provides a network comprising at least one host device having an interface card connected to a back plane of said host device,
wherein said interface card provides at least one cage for receiving a pluggable module, wherein said pluggable module comprises a diagnostic unit which receives local performance data from electronic components of said pluggable module and reports said performance data via an electrical interface to the host device.

In the network according to the present invention, the detection of relevant digital performance data is performed within the pluggable module without using further active apparatuses. The measurement of the performance is performed within said pluggable module which in turn is located directly within an application apparatus or host device, such as an Ethernet switch of the client. By using such a pluggable module, the supply of an additional active data transmission technique for the provision of performance data and for controlling a link integrity at the side of the client can be completely avoided.

In an embodiment of the network according to the present invention, the pluggable module further performs a traffic management of data transported via an optical fibre connected to the pluggable module in the electrical or optical domain.

The invention provides a pluggable module for transport of data via at least one optical fibre between host devices, wherein said pluggable module comprises a diagnostic unit which receives local performance data from electronic components of said pluggable module and reports said performance data via an electrical interface to said host device.

In a possible embodiment, the pluggable module is formed by a SFP-module.

In an alternative embodiment, the pluggable module is formed by a XFP-module.

In a possible embodiment of the pluggable module according to the present invention, the traffic management comprises near end and far end management of the transported data.

In a possible embodiment of the pluggable module according to the present invention, the traffic management is based on a communication between the pluggable module and host devices.

In a possible embodiment of the pluggable module according to the present invention, the traffic management is based on a communication between the pluggable module and host devices, wherein the communication is using a SFF 8742-programming page structure with no adaptions.

In a possible embodiment of the pluggable module according to the present invention, the traffic management is based on a communication between the pluggable module and host devices, wherein the communication is using a SFF 8742-programming page structure with no adaptions and a time division multiplex update procedure to buffer additional near end or far end parameters within the provided SFF 8472-programming page structure.

In a further embodiment of the pluggable module according to the present invention, the traffic management is based on a communication between the pluggable module and host devices, wherein the communication is using a SFF 8742-programming page structure with additional address space.

In a possible embodiment of the pluggable module according to the present invention, the traffic management is based on a communication between the pluggable module and a far end pluggable module.

In a possible embodiment of the pluggable module according to the present invention, the host devices comprise switching devices and optical transport devices.

In a possible embodiment, the switching devices comprise routers, switches, Ethernet switches and fibre channel switches.

In a possible embodiment, the optical transport devices comprise SDH, SONET, PDH, OTH, Ethernet, Fibre Channel, FICON and uncompressed video transport devices.

In an embodiment of the pluggable module according to the present invention, the pluggable module comprises an embedded communication channel (ECC) for exchanging management data, administrative data and performance monitoring data between said pluggable module and a far end pluggable module.

In a possible embodiment of the pluggable module according to the present invention, the embedded communication channel ECC is implemented at a physical layer.

In a possible embodiment of the pluggable module according to the present invention, the embedded communication channel ECC is provided by a side band modulation of a data signal of said transported data.

In a possible embodiment of the pluggable module according to the present invention, the data signal is pulse amplitude modulated.

In an embodiment of the pluggable module according to the present invention, the embedded communication channel ECC is implemented at a protocol layer.

In a possible embodiment of the pluggable module according to the present invention, the embedded communication channel ECC uses a bandwidth not occupied by a transport protocol for exchanging data between the pluggable module and the far end pluggable module.

In a possible embodiment of the pluggable module according to the present invention, the embedded communication channel ECC is provided by amplitude shift keying ASK or frequency shift keying FSK or phase shift keying PSK.

In a possible embodiment of the pluggable module according to the present invention, the embedded communication channel ECC is implemented on a proprietary overhead that is generated on top of a transport protocol.

In a possible embodiment of the pluggable module according to the present invention, the embedded communication channel ECC is implemented based on an overhead of a transport protocol.

In a possible embodiment of the pluggable module according to the present invention, the embedded communication channel ECC is implemented in a frame structure of a protocol.

In a possible embodiment of the pluggable module according to the present invention, the embedded communication ECC is implemented within a protocol layer.

In an embodiment of the pluggable module according to the present invention, the electronic components from which the diagnostic unit receives local performance data comprise a transmission diode, a receiving diode, a laser driver LD, a transimpedance amplifier TIA and a limiting or linear amplifier.

In a possible embodiment of the pluggable module according to the present invention, the electrical interface comprises an I²C bus.

In an embodiment of the pluggable module according to the present invention, the diagnostic unit comprises a memory for storing local performance data of the pluggable module.

In an embodiment of the pluggable module according to the present invention, the pluggable module comprises a mapping unit which controls a laser driver depending on the local performance data received from the diagnostic unit to transfer the performance data via the embedded communication channel ECC to the remote pluggable module.

In an embodiment of the pluggable module according to the present invention, the pluggable module comprises a demapping unit for storing performance data extracted from the embedded communication channel ECC in a memory of the diagnostic unit.

In an embodiment of the pluggable module according to the present invention, the performance data is extracted at a transimpedance amplifier TIA.

In an embodiment of the pluggable module according to the present invention, the performance data comprises SFF 8472-performance parameters.

In an embodiment of the pluggable module according to the present invention, the memory is a SFF 8472-memory comprising unallocated bytes used for exchanging DMI (digital monitoring interface)-performance data with a far end pluggable module.

In an embodiment of the pluggable module according to the present invention, a second set of said SFF 8472-performance data which indicates a performance at the far end is stored.

In an embodiment of the pluggable module according to the present invention, near end or far end digital performance parameters are stored in said memory.

In an embodiment of the pluggable module according to the present invention, the DMI (digital monitoring interface)-performance data comprises a voltage, temperature and laser bias.

In a possible embodiment of the pluggable module according to the present invention, the pluggable module performs near-end and far-end bidirectional performance monitoring.

In an embodiment of the pluggable module according to the present invention, the pluggable module comprises at least one data processing circuit such as a FPGA for performing performance monitoring.

In an embodiment of the pluggable module according to the present invention, the data processing circuit is connected to a diagnostic unit of the pluggable module.

In a possible embodiment of the pluggable module according to the present invention, the data processing circuit increments at least one performance counter provided in a memory of the diagnostic unit depending on a measured performance indicator.

In an embodiment of the pluggable module according to the present invention, the performance indicator is formed by a BER (bit error rate), a CV (code violation) or by frame drops.

In an embodiment of the pluggable module according to the present invention, the memory of the diagnostic unit is a SFF 8472-memory comprising unallocated bytes used for a ES (error seconds) and a SES (severe error seconds) performance counter.

In an embodiment of the pluggable module according to the present invention, said pluggable module comprises a SERDES (serial deserializer) for supplying data from a transmit data path to said data processing circuit, and a SERDES for supplying data from the reception data path of the pluggable module to said data processing circuit.

In an embodiment of the pluggable module according to the present invention, the pluggable module performs a latency measurement of a latency for transporting data from the pluggable module to a remote far end pluggable module.

In an embodiment of the pluggable module according to the present invention, the pluggable module performs a link test.

In an embodiment of the pluggable module according to the present invention, the pluggable module further performs a protocol mapping between two transport protocols.

In an embodiment of the pluggable module according to the present invention, the protocol mapping comprises payload mapping.

In a further embodiment of the pluggable module according to the present invention, the protocol mapping comprises overhead mapping.

In an embodiment of the pluggable module according to the present invention, the transport protocol comprises a OTH, Ethernet, SDH or Sonet data transport protocol.

In an embodiment of the pluggable module according to the present invention, the protocol mapping is configurable.

In an embodiment of the pluggable module according to the present invention, the transport protocols comprise OSI layer 1, OSI layer 2 and OSI layer 3 protocols.

In an embodiment of the pluggable module according to the present invention, the pluggable module performs loop switching.

In an embodiment of the pluggable module according to the present invention, the pluggable module further provides a single fibre working (SFW) on both interface ports to provide bidirectional east and west communication within an optical network.

In an embodiment of the pluggable module according to the present invention, the pluggable module further provides time slots based add-drop functionality between an optical network interface and an electrical host interface.

In an embodiment of the pluggable module according to the present invention, the electrical host interface is a standard MSA-interface.

In an embodiment of the pluggable module according to the present invention, a configuration of an add/drop protocol bandwidth within a standard protocol and an add/drop network element topology is configurable from the far end side.

In an embodiment of the pluggable module according to the present invention, the pluggable module further provides a management protocol between multiple pluggable modules that performs a network topology detection.

In an embodiment of the pluggable module according to the present invention, the pluggable module provides a management protocol between multiple pluggable modules that perform automatic configuration of multiple pluggable modules that are connected to a common network based upon the topology information data and a set of default parameters.

In an embodiment of the pluggable module according to the present invention, the management protocol and configuration capability provides an homogenous distribution of an available protocol bandwidth within the network of pluggable modules.

In an embodiment of the pluggable module according to the present invention, the pluggable module comprises asymmetric TDM (TDMA).

In an embodiment of the pluggable module according to the present invention, the pluggable module performs monitoring and manipulation of optical signals.

In an embodiment of the pluggable module according to the present invention, the pluggable module comprises an optical filter.

In a further embodiment of the pluggable module according to the present invention, said pluggable module comprises a variable optical attenuator (VOA).

In an embodiment of the pluggable module according to the present invention, the pluggable module comprises an optical amplifier.

In an embodiment of the pluggable module according to the present invention, the pluggable module comprises an optical switching device.

In an embodiment of the pluggable module according to the present invention, the pluggable comprises a dispersion compensation unit.

In an embodiment of the pluggable module according to the present invention, the pluggable module comprises an optical power splitter device.

In an embodiment of the pluggable module according to the present invention, the pluggable module comprises an optical loop device.

In an embodiment of the pluggable module according to the present invention, the pluggable module comprises an optical connection device.

The invention further provides an interface card for a host device comprising at least one cage for receiving a pluggable module which comprises a diagnostic unit which receives local performance data from electronic components of said pluggable module and reports said performance data via an electrical interface to said host device.

The invention further provides a host device comprising at least one interface card connected to a backplane of the host device, wherein said interface card comprises at least one cage for receiving a pluggable module.

The invention further provides a data transport system for transporting optical data via at least one optical fibre, wherein at both ends of said optical fibre a pluggable module is attached which performs a traffic management of data transported via an optical fibre connected to the pluggable module.

The invention further provides a method for bidirectional transport of data between host devices of said network via at least one optical fibre, wherein a pluggable module attached to said optical fibre is connected to a corresponding cage of one of said host devices, wherein said pluggable module comprises a diagnostic unit which receives local performance data from electronic components of said pluggable module and reports said performance data via an electrical interface to said host device.

The invention further provides a computer program comprising instructions for performing such a method for bidirectional transport of data between host devices of a network via at least one optical fibre.

The invention further provides a data carrier for storing such a computer program.

BRIEF DESCRIPTION OF DRAWINGS

In the following, embodiments of the method and system according to the present invention are described with reference to the enclosed figures.

FIG. 8 shows an embodiment of a transport data system according to an embodiment of the present invention;

FIGS. 9A-9J show different embodiments of a pluggable module according to the present invention;

FIG. 10 shows an embodiment of an interface card as employed by a host device according to a possible embodiment of the present invention;

FIG. 11 shows an interface card of a host device with plugged in modules according to the present invention;

FIG. 15 shows a section within the memory shown in FIG. 14;

FIGS. 16A-16D show block diagrams of possible embodiments of the pluggable module according to the present invention;

FIGS. 17, 17A, 17B show examples of data structures of a memory within possible embodiments of the pluggable module according to the present invention;

FIGS. 27A, 27B, 27C illustrate different functions by the pluggable module according to the present invention;

FIGS. 28A, 28B illustrate further embodiments of a pluggable module according to the present invention.

DETAILED DESCRIPTION OF EMBODIMENTS

Figure 5:
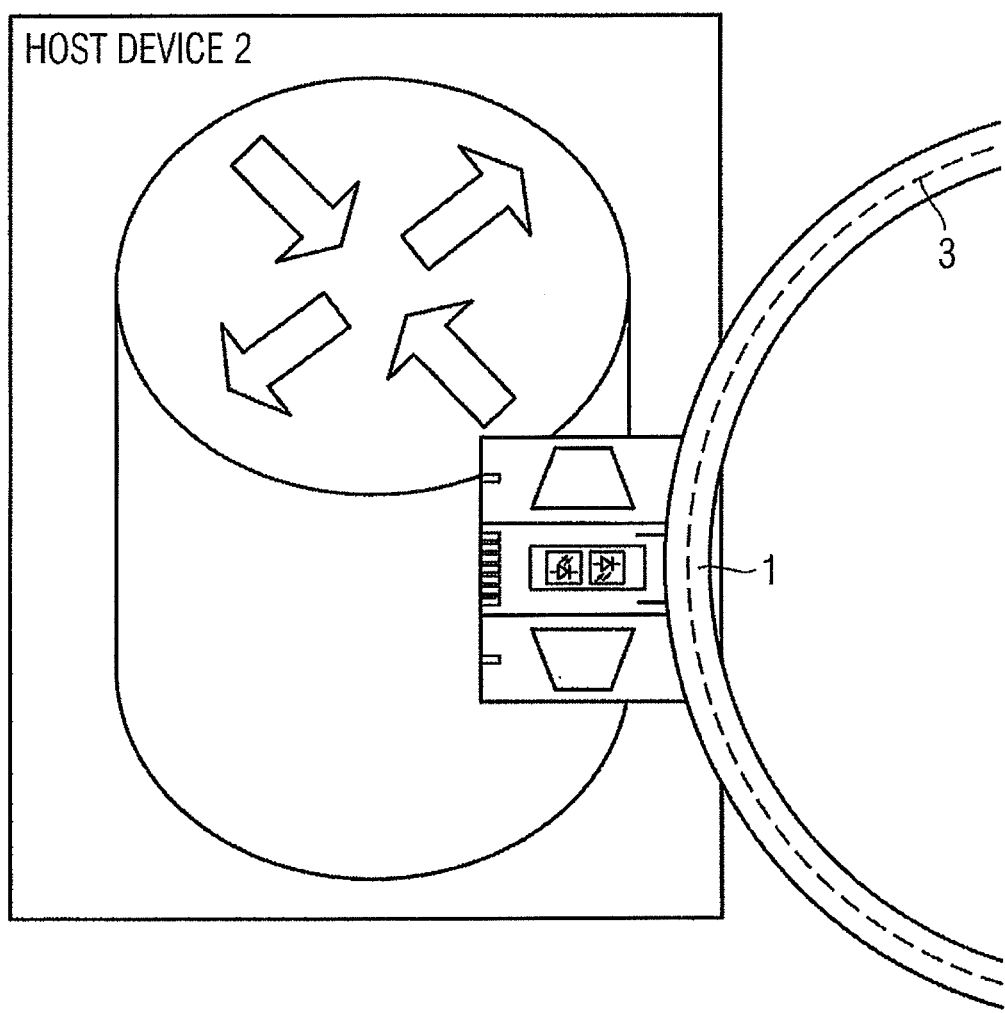
FIG. 5 shows a block diagram of a host device with a plugged-in pluggable module according to the present invention.

FIG. 5 shows a pluggable module 1 according to the present invention plugged into a cage of a host device 2. The host device 2 can be a switching device, such as a router, a bridge, an Ethernet bridge or a fibre channel switch. The pluggable module 1 as shown in FIG. 5 is adapted to be plugged into a corresponding cage 6 of the host device 2 and performs performance monitoring of electronic components. Furthermore, the pluggable module 1 can perform in a possible embodiment a traffic management of data which is transported bidirectionally via at least one optical fibre 3 between host devices 2 of a data network. The traffic management can comprise the provision of an Embedded Communication Channel (ECC) and reporting of DMI data via said Embedded Communication Channel. The pluggable module 1 further provides digital performance monitoring, Latency measurements, performing of link tests, protocol mapping time-slot based ADM, asymmetric TDM as well as optical signal processing.

The pluggable module 1 according to the present invention comprises a diagnostic unit 22 as shown in the embodiments of FIGS. 16A, 16B, 16C, 16D as well as in the embodiments of FIGS. 18A, 18B, 19, 20, 21, 22, 23. The diagnostic unit 22 receives local performance data from electronic components within the pluggable module 1 and reports this performance data via an electrical interface 8 to the respective host device 2. The monitored electronic components can comprise a transmission diode, a receiving diode, a laser driver, a transimpedance amplifier and a limiting or linear amplifier provided within the pluggable module 1. The diagnostic unit 22 can include a memory for storing local performance data of the pluggable module 1. This memory can in a possible embodiment be formed by a SFF-8472 memory comprising unallocated bytes used for exchanging DMI (Digital Monitoring Interface) performance data with a far-end pluggable module. In a possible embodiment, a second set of SFF-8472 performance data indicating a performance of the environment is stored in the memory of the diagnostic unit 22 as well. Accordingly, the pluggable module 1 according to the present invention performs in a possible embodiment near-end and far-end bidirectional performance monitoring.

In a possible embodiment, the pluggable module 1 comprises at least one data processing circuit for performing said performance monitoring which can comprise a FPGA, a ASIC, a EPLD or a CPLD. This data processing circuit is connected to the diagnostic unit 22 of the pluggable module.

The data processing circuit which can be formed by a FPGA increments in a possible embodiment at least one performance counter provided in the memory of said diagnostic unit 22 depending on a measured performance indicator. This performance indicator can be formed by a BER (Bit Error Rate) or by measuring a CV (Code Violation), a corrected or uncorrected FEC (Forward Error Correction) or frame drops.

In a possible embodiment, the memory provided within the diagnostic unit 22 of said pluggable module 1 is a SFF-8472 memory comprising unallocated bytes for used ES (Error Seconds), a SES (Severe Error Seconds) performance counter, a UAS (Unavailable Seconds) performance counter and a BER (Bit Error Rate) performance counter.

In a possible embodiment of the pluggable module 1 according to the present invention, the pluggable module comprises a SERDES 31 such as shown in the embodiment of FIGS. 16A-16D. This SERDES 31 is provided for supplying data from a transmit data path to the data processing circuit which can be formed by an FPGA. Furthermore, a SERDES 31 can be provided for supplying data from a reception data path of said pluggable module 1 to the data processing circuit 32 as shown in FIG. 16.

In a possible embodiment, the pluggable module 1 according to the present invention performs a latency measurement of a latency for transporting data from the pluggable module 1 to a far-end pluggable module of a far-end device, such as a far-end host device.

In a further embodiment, the pluggable module 1 according to the present invention can perform a link test.

In a further embodiment of the pluggable module 1 according to the present invention, the pluggable module 1 comprises a mapping unit which controls a laser driver depending on the local performance data received from the diagnostic unit 22 to transfer the performance data via an embedded communication channel ECC to the far-end pluggable module. The pluggable module 1 according to the present invention can further comprise a demapping unit 29 for storing performance data extracted from said communication channel ECC in the memory of the diagnostic unit 22.

In a preferred embodiment of the pluggable module 1 according to the present invention, a FPGA as a data processing circuit 32 is provided in the data path of a transceiver integrated in the pluggable module 1. Part of the signal within the transceiver is branched-off and supplied to the FPGA. Furthermore, an analysis of the digital protocol structure, such as coding can be performed. Furthermore, protocol failures within the digital diagnostic interface of the transceiver can be reported. In case that the FPGA is provided within the data path of the transceiver, a digital superframe can be generated for fast communication with the far-end side. Furthermore, all performance data can be reported to the far-end device. In case that the FPGA is within the data path of the transceiver, a bidirectional protocol is provided within the superframe for performing an end-to-end link test as well as for determining the latency of the signal.

The integration of the digital performance monitoring and data analysis functions within the pluggable module 1 allows a separation of service relevant data independent from a data access of the respective host device and independent from the operational functions of the host device.

In a possible embodiment, further a traffic management of the data is performed within the pluggable module 1. This can happen either performed in the electrical domain or in the optical domain. The pluggable module 1 as shown in FIG. 5 comprises an SFP (small form factor) pluggable module and also supports digital monitoring functions according to SFF 8472. The pluggable module 1 according to the present invention does not only perform transceiver functions, i.e. conversion between the optical and electrical domain, but also performance monitoring and data traffic management functions. The data traffic management is performed by the pluggable module 1 as a near end and far end traffic management of the transported data. The data traffic management is formed by a pluggable module 1 on the basis of the communication between the pluggable module 1 and different host devices 2 of the optical network. In a possible embodiment, the communication is using a SFF 8742-programming page structure with no adaptions. In further embodiments, the traffic management can be based on a communication between the pluggable module 1 and host devices 2, wherein the communication is using a SFF 8742-programming page structure with no adaptions and a time division multiplex update procedure to buffer additional near end or far end parameters within the provided SFF 8742-programming page structure. In an alternative embodiment, the traffic management can be based on a communication between the pluggable module 1 and host devices 2, wherein the communication is using a SFF 8742-programming page structure with additional address spaces. The traffic management can be based on a communication between the pluggable module 1 as shown in FIG. 5 and a far end pluggable module which is attached to a remote end of the optical fibre 3 as shown in FIG. 5. The pluggable module 1 as shown in FIG. 5 comprises several transport management functionalities, such as protection switching, performance monitoring, OAM, DCN (Data Communication Network), mapping and framing, amplification, reconfigurable optical add/drop multiplexing (ROADM) and dispersion compensation DC. Further traffic management functionalities can comprise an optical transmission impairment mitigation, such as amplification and chromatic polarization mode compensation.

A traffic management functionality provided by a pluggable module 1 according to an embodiment of the present invention is electrical transmission and impairment mitigation with forward error correction and electronic dispersion compensation.

A further traffic management functionality of the pluggable module 1 according to an embodiment of the present invention can be in one embodiment OAM (operation administration and maintenance) functionalities, such as performance monitoring, default management, inter-device communication, configuration management and security management.

In a possible embodiment, the pluggable module 1 according to the present invention can comprise also optical and/or electrical add/drop multiplexing functionalities. Furthermore, in a possible embodiment, the traffic management functionality of the pluggable module 1 comprises optical conversion with mapping and framing functions. The pluggable module 1 complies in a possible embodiment with existing MSA-agreements, such as SFP, SFP+, XFP, GBIC etc.

Figure 6:
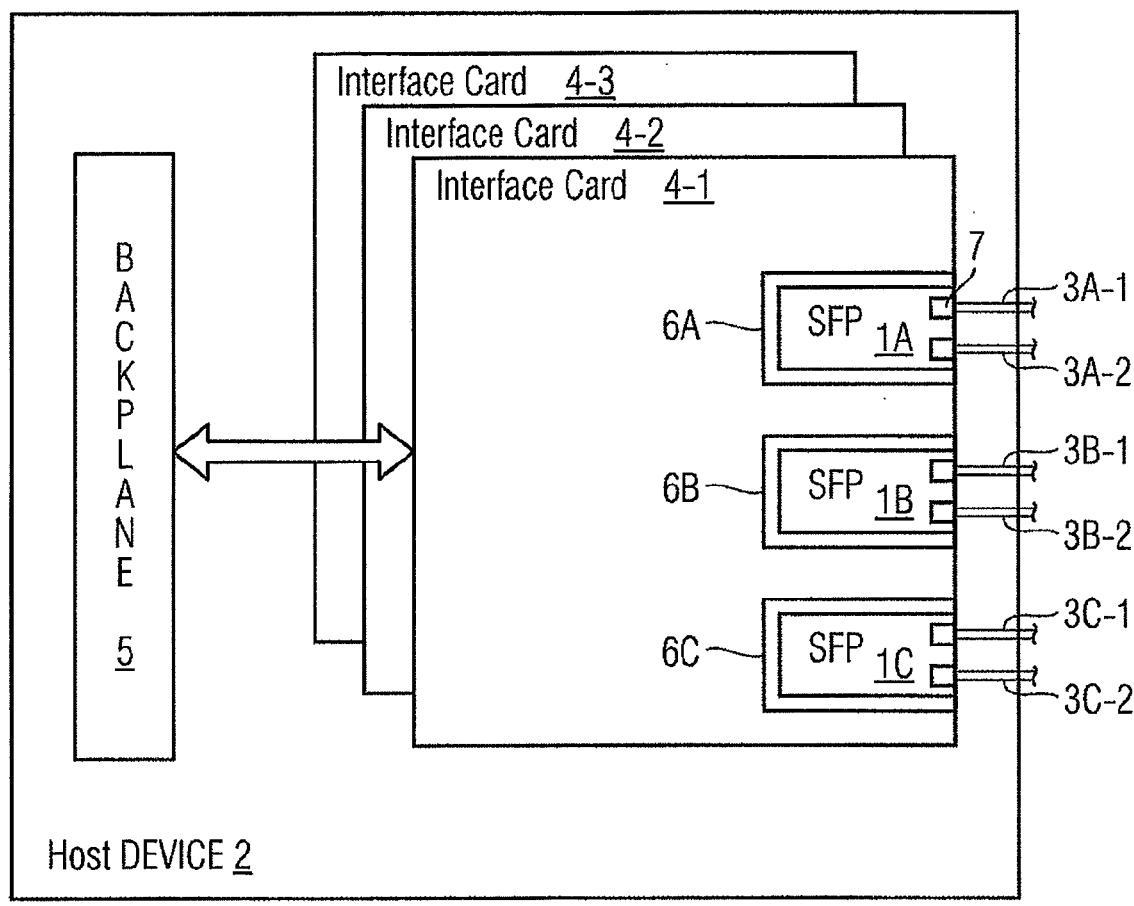
FIG. 6 shows a block diagram of a host device according to an embodiment of the present invention.

FIG. 6 shows a possible embodiment of a host device 2 according to the present invention. The host device 2 comprises at least one interface card 4 connected to a common backplane 5 of the host device 2. Each interface card 4 comprises several cages 6 for receiving pluggable modules 1 according to the present invention. In the given example of FIG. 6, the interface card 4-1 comprises three cages 6A, 6B, 6C for receiving a corresponding SFP pluggable modules 1A, 1B, 1C. Each pluggable module 1 comprises on the front side an optical interface 7 to at least one optical fibre 3. In the given example, each SFP plug-in module 1 as shown in FIG. 6 comprises an interface with two optical fibres for bidirectional optical transport of data. On the rear side, each pluggable module 1 comprises at least an electrical interface for connecting the pluggable module 1 with the circuitry on the interface card 4 of the host device 2.

Figure 7:
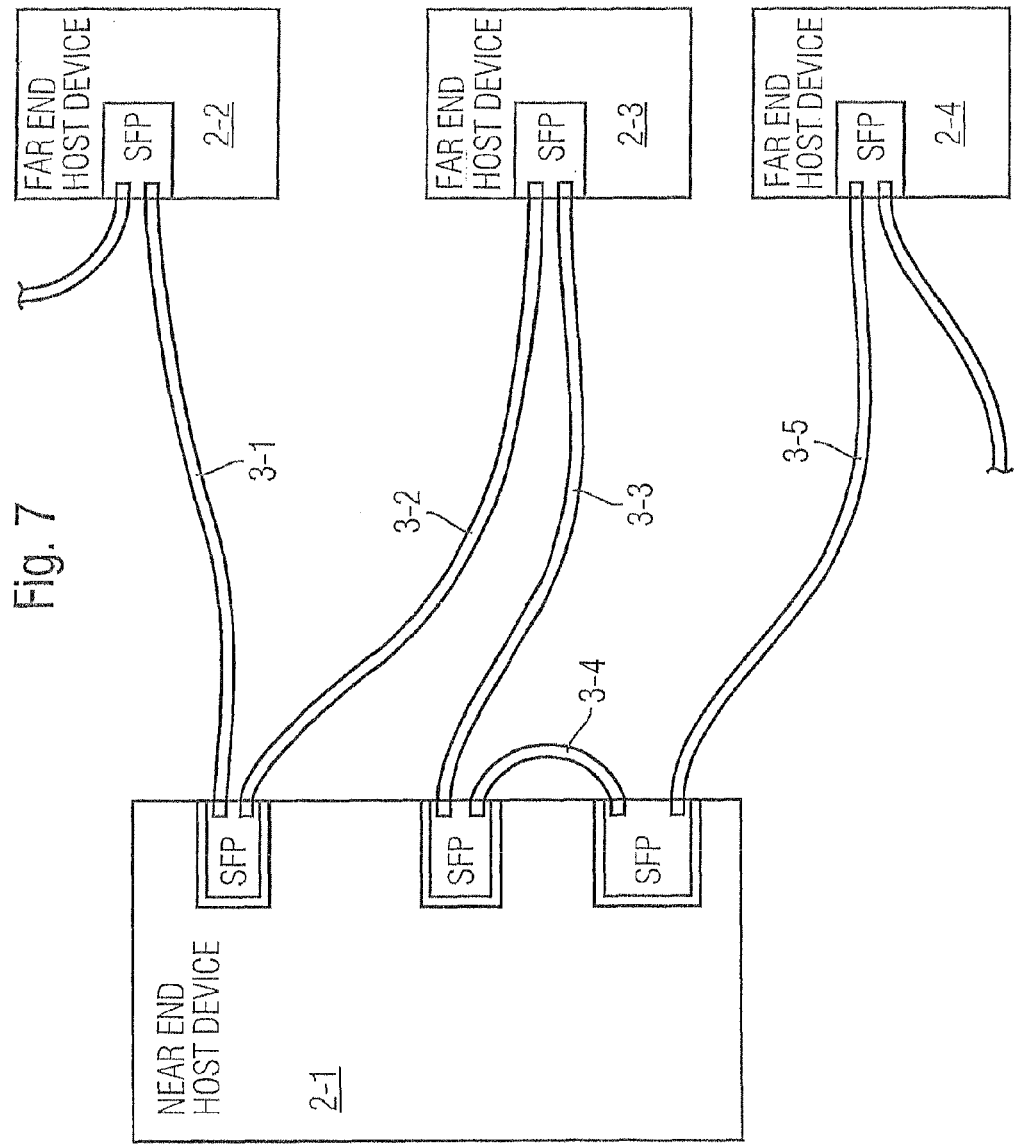
FIG. 7 shows an exemplary arrangement of host devices connected to each other by means of a data transport system according to a possible embodiment of the present invention.

FIG. 7 shows an example for connecting host devices 2 of a network via pluggable modules 1 according to the present invention. In the given example, a near end host device 2-1 can be connected via data transport systems to far end host devices 2-2, 2-3, 2-4. Each data transport system is provided for transporting bidirectional optical data via at least one optical fibre 3. At both ends of the optical fibre 3, a pluggable SFP-module 1 is attached and performs a performance monitoring and a.

FIG. 8 shows a possible embodiment of a data transport system for transporting bidirectional optical data according to the present invention. As shown in FIG. 8, two pluggable modules 1A, 1B are attached via an optical interface to at least one optical fibre 3 connecting both modules. In a possible embodiment, at least one of the pluggable modules 1A, 1B is capable of performing a data traffic management. In a possible embodiment, both pluggable modules are formed by SFP-modules connected to each other via optical fibres 3.

As can be seen from FIG. 7, with the data transport system according to the present invention as shown in FIG. 8, it is possible to connect a near end host device 2-1 to a far end host device. It is also possible to wire the near end host device 2-1, for example via an optical fibre 3-4 as shown in FIG. 7. As can be seen from FIG. 7, the network according to the present invention has the advantage when compared to the conventional system of FIG. 4 that a separate transport system device in a separate box is no longer necessary so that wiring host devices 2 within the network is much easier and more flexible. Since the separate transport system device is no longer necessary, the optical network using the pluggable modules 1 according to the present invention needs less space and is more transparent to users performing the wiring between the host devices 2.

Figure 1:
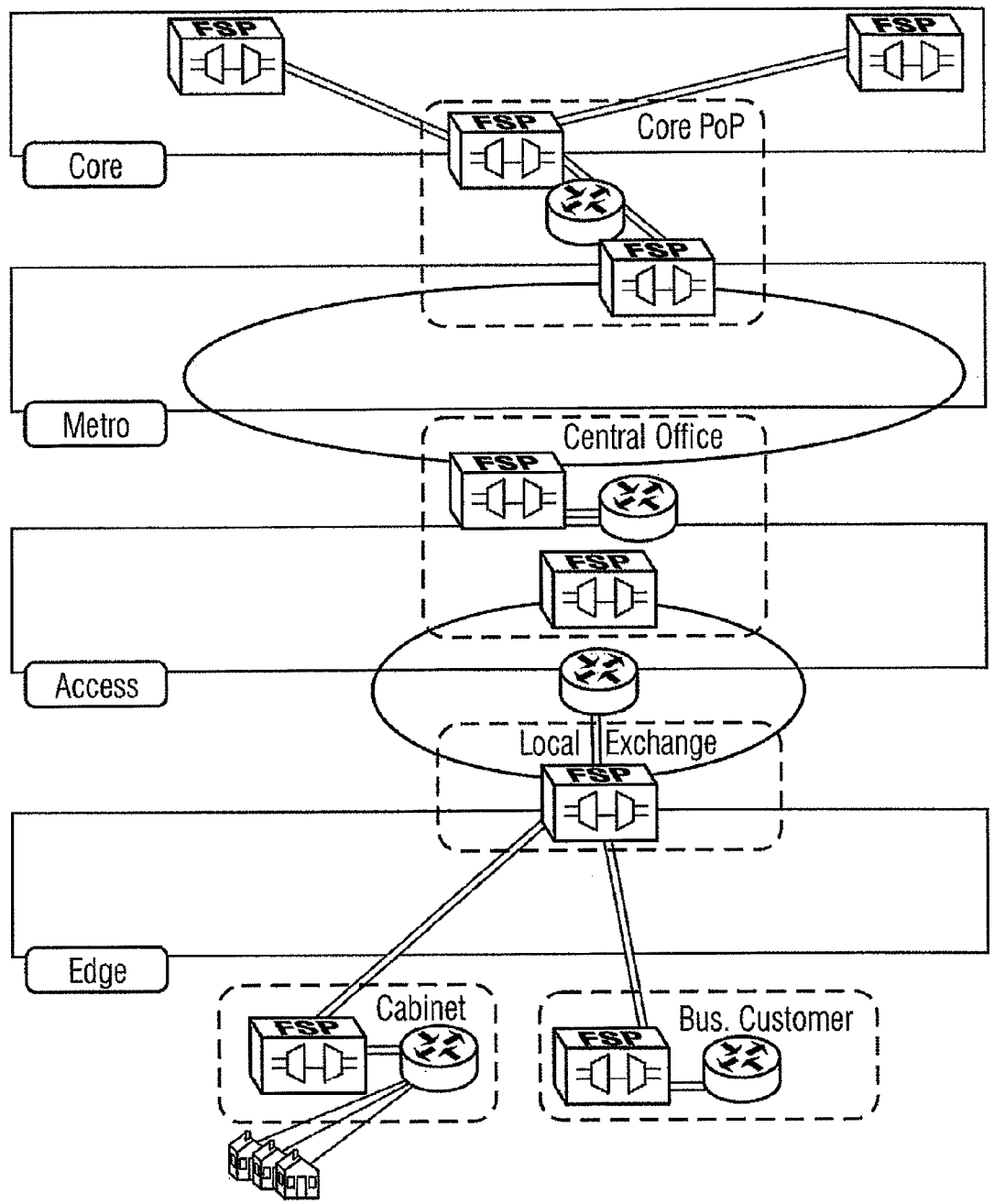
FIG. 1 shows an architecture of a hierarchical network according to the state of the art.
Figure 2:
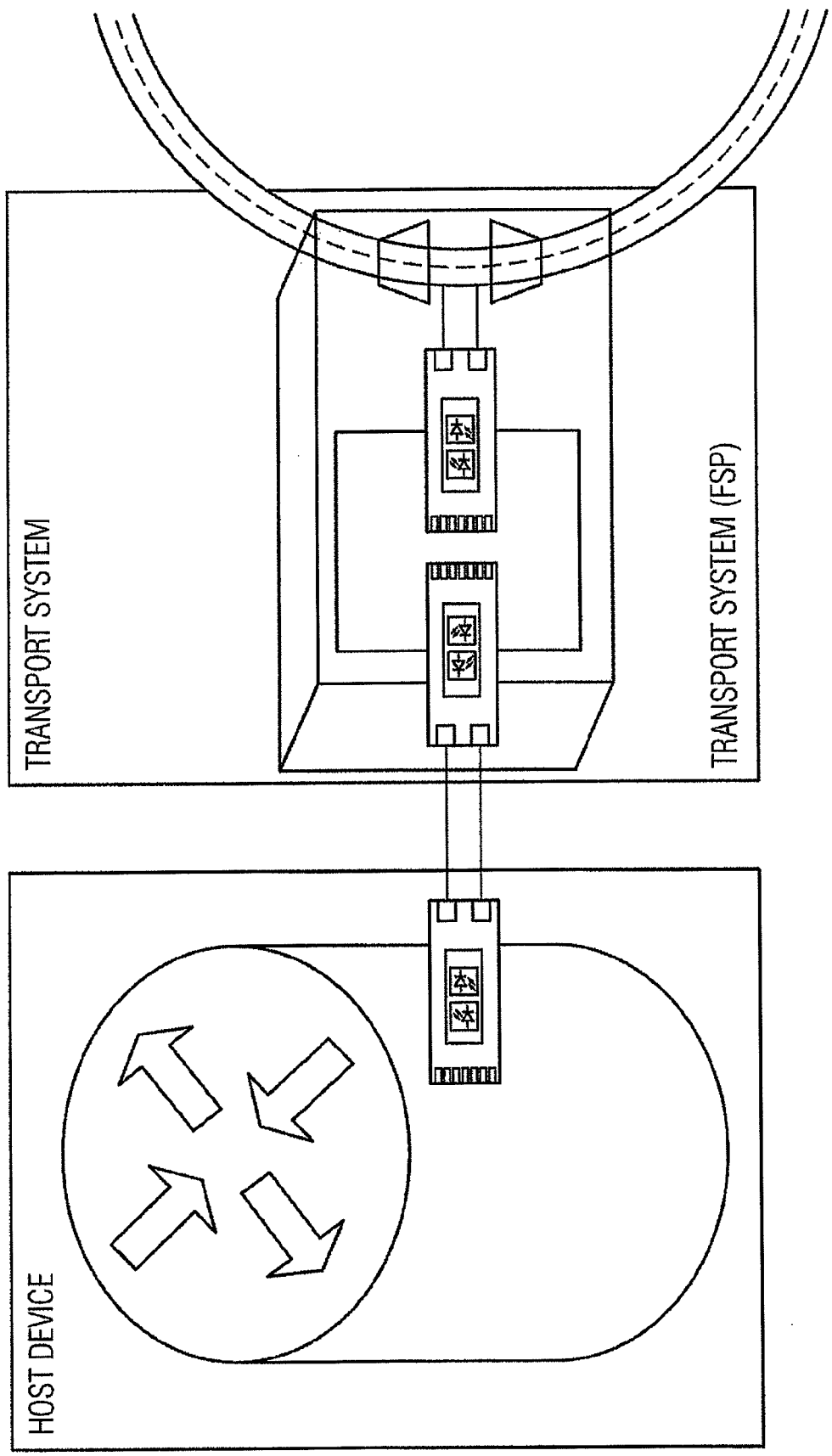
FIG. 2 shows an arrangement of a host device and a transport system according to the state of the art.
Figure 3:
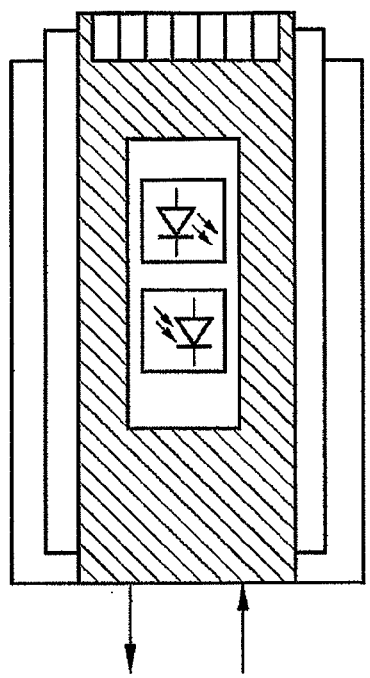
FIG. 3 shows a conventional FSP-module with a transceiver according to the state of the art.
Figure 4:
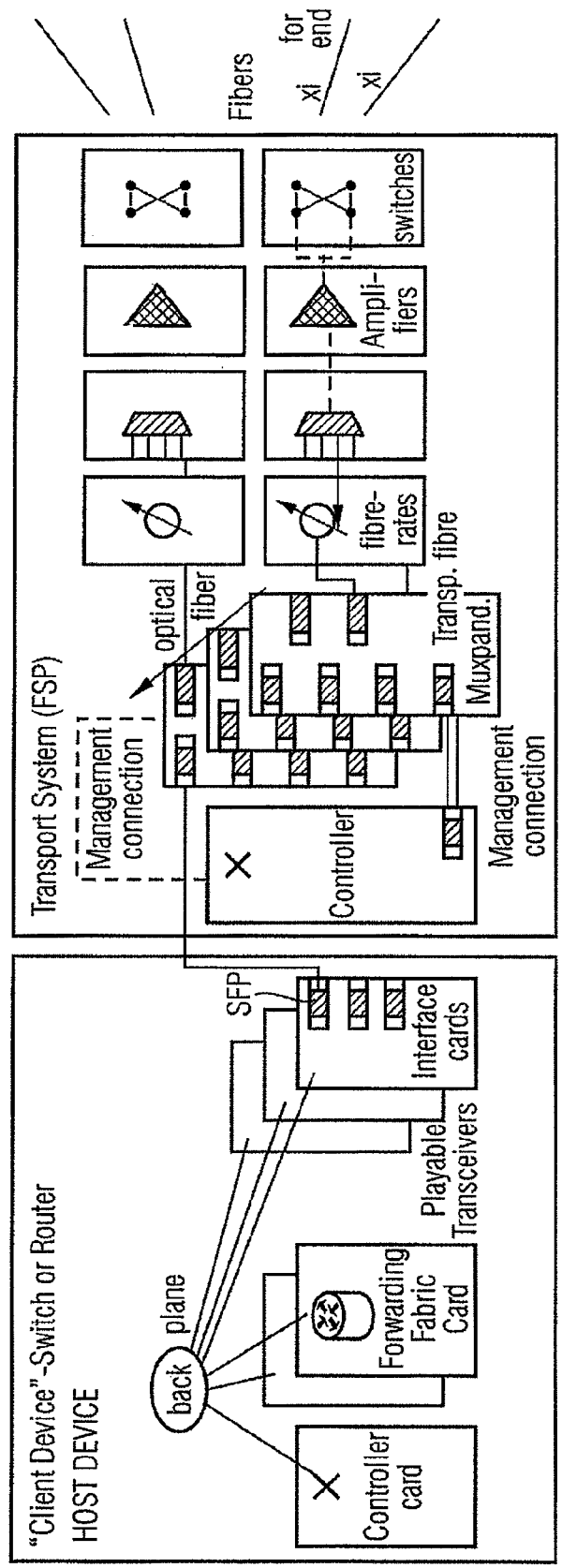
FIG. 4 shows an arrangement of a host device and a transport system according to the state of the art for illustrating the problem underlying the present invention.

A further major advantage of the optical network using the pluggable modules 1 according to the present invention resides in that the number of domain conversions between the electrical and optical domain is minimized. For the transport of data from one host device 2 to another host device 2 only one conversion on the near end side and one conversion on the far end side has to be performed. In contrast, the conventional network as shown in FIG. 4 needs three domain conversions on each side.

FIGS. 9A-9J show different embodiments of a pluggable module 1 according to the present invention. The pluggable module 1 comprises at least one optical interface 7 on the front side and an electrical interface 8 on the rear side. The electrical interface 8 comprises several electrical contacts for connecting the pluggable module 1 with the circuitry of a motherboard by inserting the pluggable module 1 into a corresponding cage 6 mounted on the mother board.

In the embodiment as shown in FIG. 9A, the pluggable module 1 comprises an unidirectional single amplifier 9 within the pluggable module 1.

The electrical interface 8 on the rear side of the pluggable module 1 can be formed by an I$^2$C bus. On the front side of the pluggable module 1, there are attached two optical fibres 3-1, 3-2, one for receiving an optical signal and one for transmitting an optical signal.

In the embodiment as shown in FIG. 9B the pluggable module 1 comprises a bidirectional signal amplifier 10, wherein each optical fibre 3-1, 3-2 transports data in both directions.

In the embodiment as shown in FIG. 9C the pluggable module 1 comprises a blocking filter 11 which can be either unidirectional or bidirectional. The blocking filter 11 can, for example block signals with different wavelength λ with the exception of a predetermined wave length. FIG. 9C shows a unidirectional blocking filter.

FIG. 9D shows a further embodiment of the pluggable module 1 according to the present invention. In the embodiment of FIG. 9D the pluggable module 1 comprises an OADM (Optical Add Drop Multiplexer)—filter 12 which is either unidirectional or bidirectional. FIG. 9D shows an unidirectional OADM-filter 12. As can be seen from FIG. 9D the pluggable module 1 has on the rear side not only an electrical interface 8 but also additional optical backplane plugs 13. In the given example, the module 1 comprises four optical backplane plugs 13. As can be seen from FIG. 9D the pluggable module 1 comprises six optical ports, i.e. four optical ports on the back side and two optical ports on the front side.

FIG. 9E shows a further embodiment of the pluggable module 1 according to the present invention. In the embodiment as shown in FIG. 9E the pluggable module 1 comprises a connector plug 14, which can be either unidirectional or bidirectional. FIG. 9E shows an unidirectional connector plug 14. The pluggable module 1 as shown in FIG. 9E connects the signals to the backplane of the host device 2 optically. To achieve this, the pluggable module 1 comprises optical backplane plugs 13-1, 13-2 as shown in FIG. 9E.

Figure 9F:
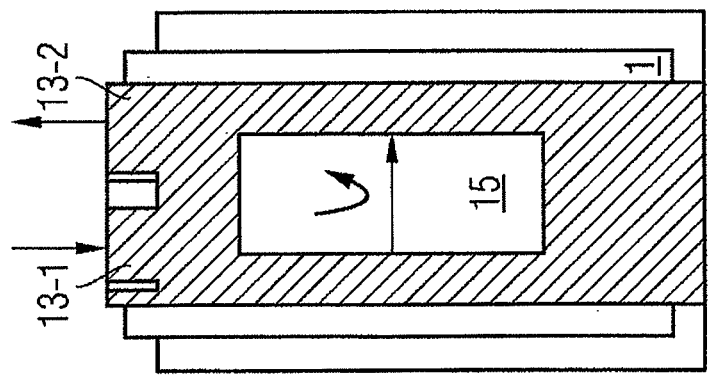

FIG. 9F shows a further embodiment of the pluggable module 1 according to the present invention. In this embodiment, the pluggable module 1 comprises a loop plug 15. The loop plug 15 can be either unidirectional or bidirectional. FIG. 9F shows a unidirectional loop plug. In the given embodiment as shown in FIG. 9F the pluggable module 1 does not comprise connectors on the front side. The loop plug 15 uses unused slots or connectors on the backside of the pluggable module 1. The loop can be either an electrical loop or an optical loop. In the example of FIG. 9F two backplane optical plugs 13-1, 13-2 form an optical loop.

Figure 9G:
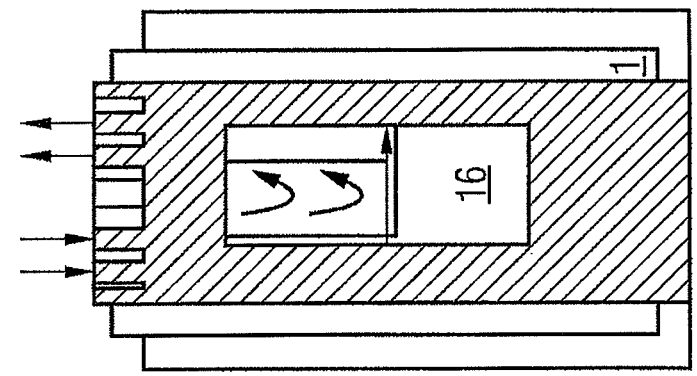

FIG. 9G shows a further embodiment of the pluggable module 1 according to the present invention. In the shown embodiment the pluggable module 1 comprises a double-loop plug 16 which loops unused slots on the back side of the pluggable module 1. In the embodiment as shown in FIG. 9G no front connectors are provided. The embodiments as shown in FIGS. 9F, 9G can be used for providing loops within a host device 2.

Figure 9H:
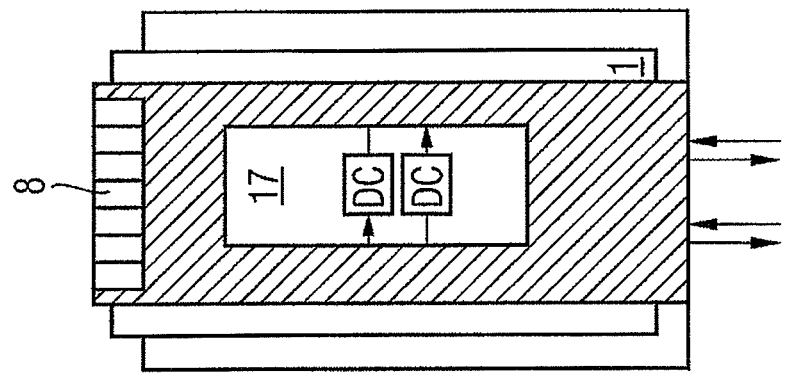

FIG. 9H shows a further embodiment of a pluggable module 1 according to the present invention. In the shown embodiment, the pluggable module 1 comprises a dispersion compensation plug 17. The dispersion compensation plug 17 can be either unidirectional or bidirectional. FIG. 9H shows a bidirectional dispersion compensation plug 17 within the pluggable module 1. The dispersion compensation unit DC can be, for example formed by a fibre bragg grating.

FIG. 9I shows a further embodiment of the pluggable module 1 according to the present invention. In the embodiment as shown in FIG. 9I the pluggable module 1 is formed by a variable optical attenuator VOA 18. The variable optical attenuator 18 can be either unidirectional or bidirectional. FIG. 9I shows a bidirectional variable optical attenuator 18.

FIG. 9J shows in a further embodiment of the pluggable module 1 according to the present invention. In the shown embodiment the pluggable module 1 comprises a power splitter 19. The power splitter 19 can be either unidirectional or bidirectional. FIG. 9J shows a unidirectional power splitter. In the given example of FIG. 9J the pluggable module 1 comprises six ports, for example port 1 may have 100%, port 5 x %, port 2 100−x % of the power and port 3, 6, 4 may have an identical signal but with other direction.

The host device 2 as shown in FIG. 6 may comprise in a possible embodiment an optical interface card 20 for several pluggable modules 1 according to the present invention as shown in FIG. 10. In the given example of FIG. 10, different pluggable modules 1 are plugged into a corresponding cage 6 of the interface card 20 of a host device 2. The interface card 20 comprises in the given example nine cages 6-1 to 6-9 each provided for receiving a corresponding pluggable module 1. In the given example of FIG. 10 the pluggable modules 1-1, 1-2, 1-3, 1-5 and 1-6 are plugged into the corresponding cages 6 of the interface card 20. In the given example the pluggable module 1-1 comprises an unidirectional amplifier 9, the second pluggable module 1-2 comprises a blocking filter 11 and the third pluggable module 1-3 is formed by a transceiver 21. The pluggable module 1-5 is also formed by a transceiver and the pluggable module 1-6 shown in FIG. 10 is formed by a variable optical attenuator VOA 18. The cages 6-4, 6-7, 6-8, 6-9 of the cartridge 20 are empty in the given example of FIG. 10.

FIG. 11 shows a further example of a interface card 20 showing two wave lengths OADM. In the given example the first six cages 6-1 to 6-6 of the interface card 20 are occupied by plugged in pluggable modules 1-1 to 1-6. In the given example the first pluggable module 1-1 comprises a connector plug 14, the second pluggable module 1-2 comprises a blocking filter 11, the third pluggable module 1-3 comprises also a blocking filter 11, the fourth pluggable module 1-4 comprises a connector plug 14, the fifth pluggable module 1-5 is formed by a transceiver 21 and the sixth pluggable module 1-6 also comprises a transceiver 21.

Figure 12:
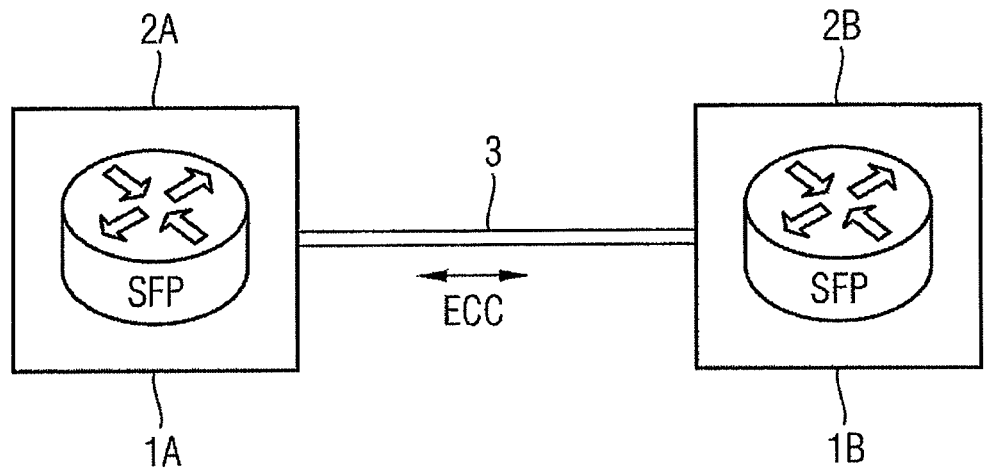
FIG. 12 shows a diagram for illustrating an embedded communication channel which is provided by a pluggable module according to an embodiment of the present invention.

In an embodiment of the pluggable module 1 according to the present invention, the pluggable module 1 further provides an embedded communication channel ECC as illustrated by FIG. 12. The embedded communication channel ECC is provided between two pluggable modules 1A, 1B and is provided for exchanging management data, administrative data and performance monitoring data between the near end pluggable module 1A and a far end pluggable module 1B. In a possible embodiment the embedded communication channel ECC is implemented at a physical layer. The embedded communication channel ECC can be provided by amplitude shift keying (ASK), frequency shift keying (FSK) or phase shift keying (PSK). In a possible embodiment the embedded communication channel ECC is provided by side band modulation of a data signal of transported data. In a possible embodiment the data signal is pulse amplitude modulated.

In a further embodiment the embedded communication channel ECC between the pluggable modules 1A, 1B is implemented at a protocol layer. In a possible embodiment the embedded communication channel ECC uses a bandwidth not occupied by a transport protocol for exchanging data between the near end pluggable module 1A and a far end pluggable module 1B.

In a possible embodiment the embedded communication channel ECC is implemented on a proprietary overhead that is generated on top of a transport protocol.

In a further embodiment the embedded communication channel ECC can be implemented based on the overhead of a transport protocol, such as idle data patterns in inter-frame gaps.

In a further embodiment the embedded communication channel ECC can be implemented within a protocol layer, such as an Ethernet protocol. The embedded communication channel ECC can use existing protocol overheads or space in inter-frame gaps which can be implemented inside a protocol layer, such as EFM.

The mapping/demapping of data within the embedded communication channel ECC is performed within the pluggable module 1A, 1B.

The purpose of the provided embedded communication channel ECC is to read performance monitoring data from the far end side, write PM-data to the far end side and to perform topology detection within the network of pluggable modules 1. The embedded communication channel ECC can be provided to read communication data from the far end side and to report to an internal controller of the near end pluggable module 1. With the embedded communication channel ECC it is further possible to write configuration data to the far end pluggable module controller and to allow communication between a near end host device 2A and a far end host device 2B as shown in FIG. 11.

The provision of an embedded communication channel ECC allows remote reporting of diagnostic parameters, such as DMI. Furthermore, it is possible to make remote diagnostics parameters permanently available at a remote side, for example power local, power remote. By using standard SFF 8472 digital diagnostics I/F, it is possible to latch remote data, i.e. store the data in a memory of the pluggable module 1.

There are two main possibilities for implementation of the embedded communication channel ECC. In a physical layer implementation of the embedded communication channel ECC, for example a pilot tone can be used. By using, for example a slow AM modulation scheme (10%, KHz range) available diagnostic I/F data can be imprinted on the embedded communication channel ECC.

In an alternative embodiment, the embedded communication channel ECC can be implemented on a protocol layer. For example, the embedded communication channel ECC can be provided on top of a service protocol. In a possible embodiment, a high speed capable integrated circuit can be provided in a data path to imprint the embedded communication channel ECC. Imprinting of the embedded communication channel ECC can, for example use of inter-frame gaps for creation of an overhead OH. The available digital diagnostic I/F data can be imprinted or transferred on the embedded communication channel ECC.

Figure 13:
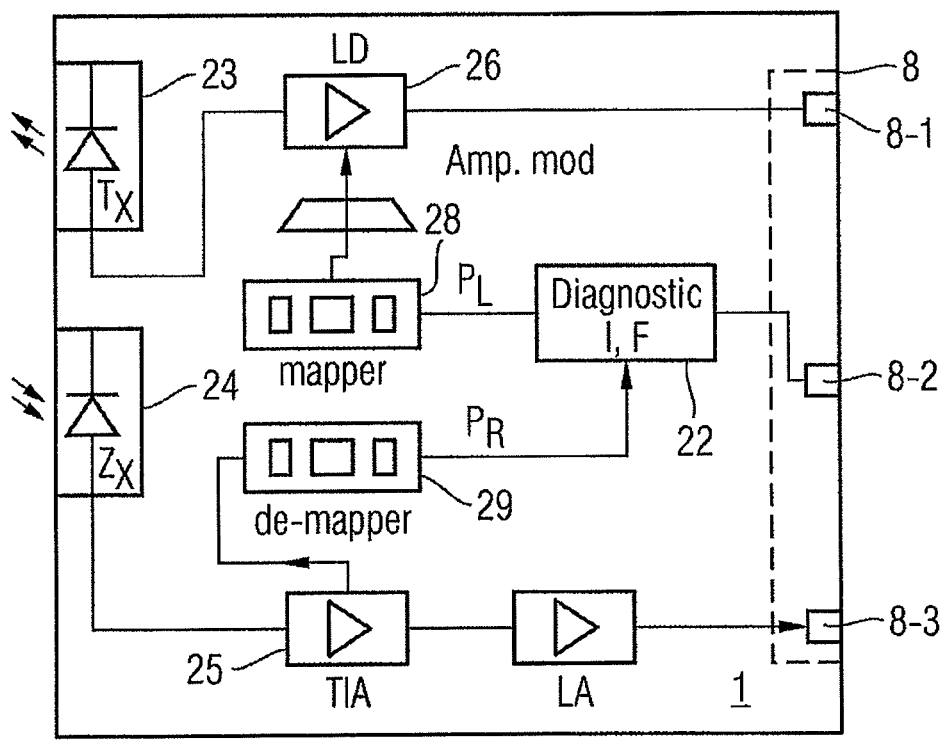
FIG. 13 shows a block diagram of a possible embodiment of a pluggable module according to the present invention.

FIG. 13 shows a possible embodiment for the pluggable module 1 comprising an embedded communication channel ECC. In the shown embodiment, the pluggable module 1 comprises a diagnostic unit 22 to receive local performance data and electronic components within the pluggable module 1. These electronic components comprise in the given example a transmission diode 23, a receiving diode 24, a transimpedance amplifier TIA 25, a laser driver 26 and a limiting or linear amplifier 27.

On the backside of the pluggable module 1 the electrical interface 8 comprises a data transmission interface 8-1, an electrical reporting interface 8-2 and for the reception data path an electrical data reception interface 8-3. Furthermore, the pluggable module 1 comprises a mapping unit 28 which controls the laser driver 26 depending on local performance data received from the diagnostic unit 22 to transfer the performance data via the provided embedded communication channel ECC to a remote pluggable module 1.

As can be seen from FIG. 13, the pluggable module 1 further comprises a demapping unit 29 for storing performance data extracted from the embedded communication channel ECC in a memory of the diagnostic unit 22. The performance data can be extracted, for example at the transimpedance amplifier 25 and the embedded communication channel ECC can be provided by side band modulation of a data signal of the transported data stream. The diagnostic unit 22 receives local performance data from the electronic components 23, 24, 25, 26, 27, such as temperature T or power consumption P. In a possible embodiment, the diagnostic unit 22 reports the received local (near end) performance data and the received remote (far end) performance data transported via the embedded communication channel ECC via the electrical interface 8-2 to a controlling device of the host device 2 into which the pluggable module 1 is inserted. The electrical interface 8-2 can be formed in a possible embodiment by an $I^2C$ bus. In a possible embodiment, the performance data extracted at the transimpedance amplifier TIA comprises SFF 8472-performance parameters. In a possible embodiment, the diagnostic unit 22 comprises a memory for storing local performance data of the pluggable module 1 as well as the received and extracted performance data of remote pluggable modules.

Figure 14:
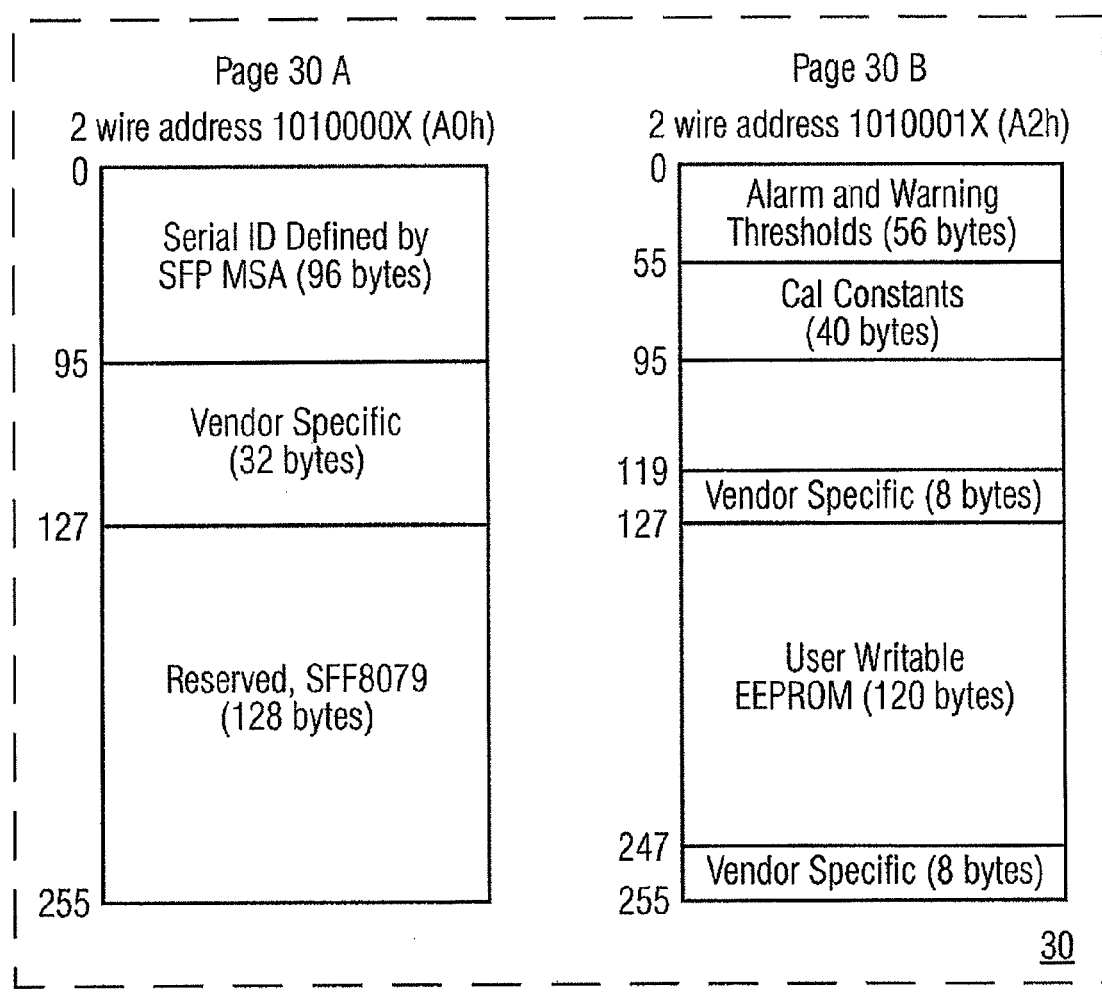
FIG. 14 shows a data structure of a memory within a pluggable module according to a possible embodiment of the present invention.

FIG. 14 shows schematically a memory content of a memory 30 within the diagnostic unit 22 as shown in FIG. 13. In the shown embodiment, the memory 30 is a SSF 8472-memory having a page 30A and a page 30B. As can be seen from FIG. 14, in the SSF 8472-memory unallocated bytes on page 30B are used for exchanging DMI (digital monitoring interface) performance data with a far end pluggable module 1. This memory space can be used for transferring data from the diagnostic unit 22 to the respective host device 2.

FIG. 15 shows the memory space page 30B for storing real time diagnostic interface data in more detail. Data bytes 96-105 are used for local near end parameter data. As can be seen from FIG. 15 data bytes 106-109 are unallocated data which can be used for transferring data via the embedded communication channel ECC to a far end pluggable module. In a possible embodiment, the parameter data is refreshed in a fixed time period interval, such as every five seconds.

As can be seen from FIG. 13, the mapping and demapping units 28, 29 are connected to a SFF 8472-diagnostic unit. The near end SSF 8472-data is read and written into the embedded communication channel ECC by the mapping unit 28. The embedded communication channel ECC is read and the far end SFF 8472-parameter data is extracted and written to the near end SFF 8472-unit 22. The data is written to a diagnostic SSF 8472-unit 22 which supports SSF 8472 programming pages, so that address space extensions can be avoided to prevent adaptions of the hardware and software of the host device 2. To meet space constraints within the SSF 8472-address space a proprietary TDM-mapping scheme can be supported to map such data sets into the address space.

In a possible embodiment of the pluggable module 1 according to the present invention, the pluggable module 1 performs near end and far end bidirectional performance monitoring.

FIGS. 16A, 16B show embodiments employing parallel processing using SERDES (serial/deserializer). FIGS. 16C, 16D show embodiments of the pluggable module 1 employing serial processing using high speed FPGA-interfaces. As can be seen from FIG. 16A, a SERDES (serial/deserializer) 31 is provided for supplying data from a transmit data path to a data processing circuit 32 such as a field programmable gate array (FPGA). The data processing circuit 32 can also be formed by an ASIC, EPLD or CPLD.

A further SERDES (serial/deserializer) 33 is provided for supplying data from a reception data path of said pluggable module 1 to the FPGA 32.

The digital performance monitoring is provided for observing data streams. The SERDES 31, 33 are provided for parallizing a high speed signal into a number of low speed data streams.

In the embodiments shown in FIGS. 16C, 16D the SERDES 31, 33 are incorporated in the FPGA 32. In the embodiment shown in FIG. 16A the SERDES 31, 33 are provided within the data path and have high speed in- and out-interfaces for the local speed data streams. In the embodiment as shown in FIG. 16B the SERDES 31 has a high speed in-interface for a signal which is forwarded as a low speed data stream to the FPGA 32. The FPGA 32 as shown in FIGS. 16A, 16B is provided for performing performance monitoring. The FPGA 32 is connected to the diagnostic unit 22 of the pluggable module 1. In a possible embodiment, the FPGA 32 increments at least one performance counter provided in a memory 30 of the diagnostic unit 22 depending on a measured performance indicator. In a possible embodiment, the performance indicator can be formed by a BER (bit error rate), a CV (coding violation) or by frame drops.

Figure 17:
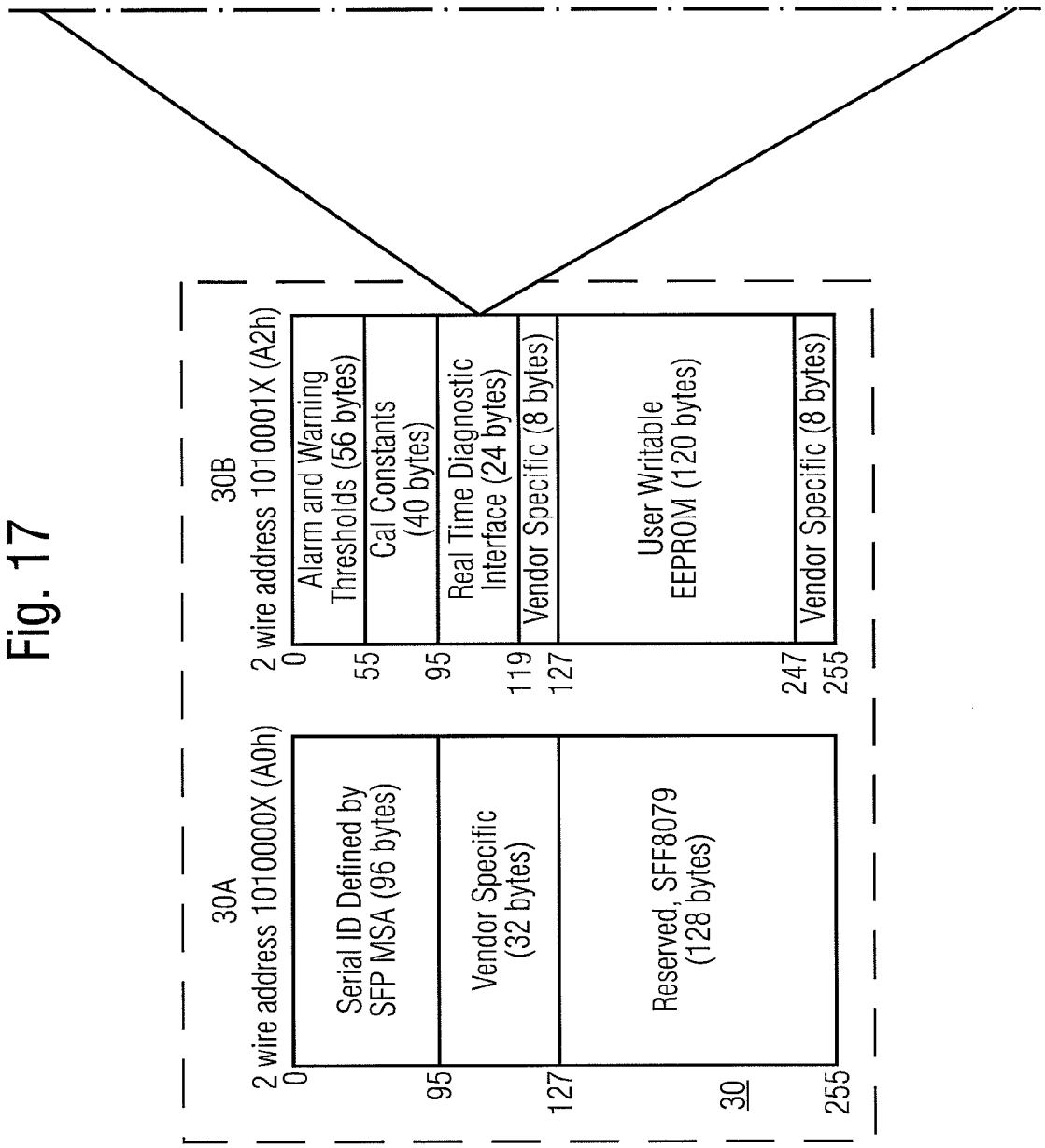
Figure 17B:
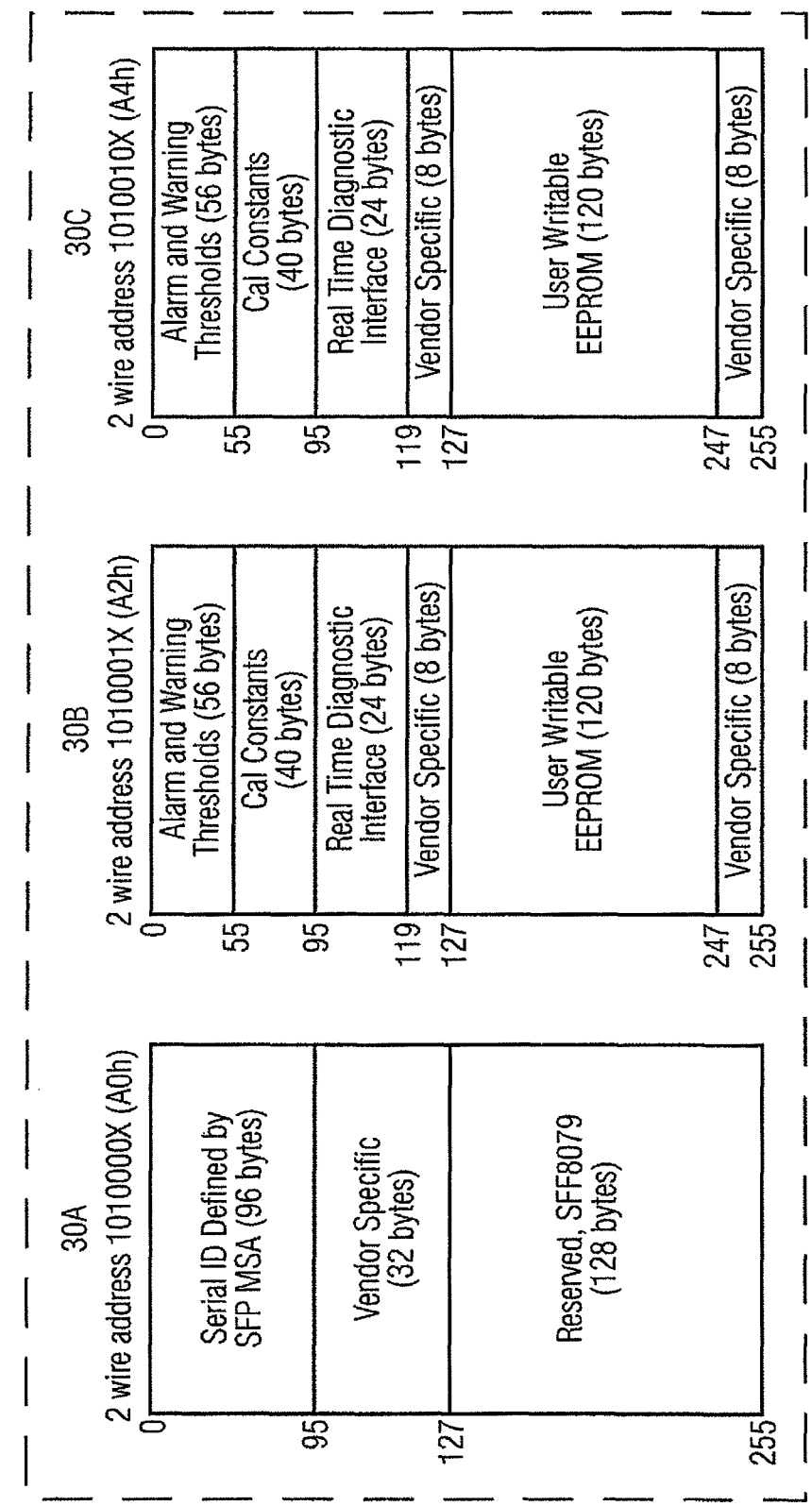

FIGS. 17A, 17B show different possibilities to read out data using a memory 30 within the diagnostic unit 22. In the embodiment as illustrated by FIG. 17A, free memory space of the memory 30 as shown in FIG. 14 is used to read out data.

In the embodiment as illustrated in FIG. 17B, an additional programming page 30C is provided to read out performance data.

In a possible embodiment, the memory 30 within the diagnostic unit 22 is a SFF 8472-memory comprising unallocated bytes used for an ES (error seconds), a SES (severe error seconds) a UAS (Unavailable Seconds) and a BER (Bit Error Rate) performance counter.

Figure 18A:
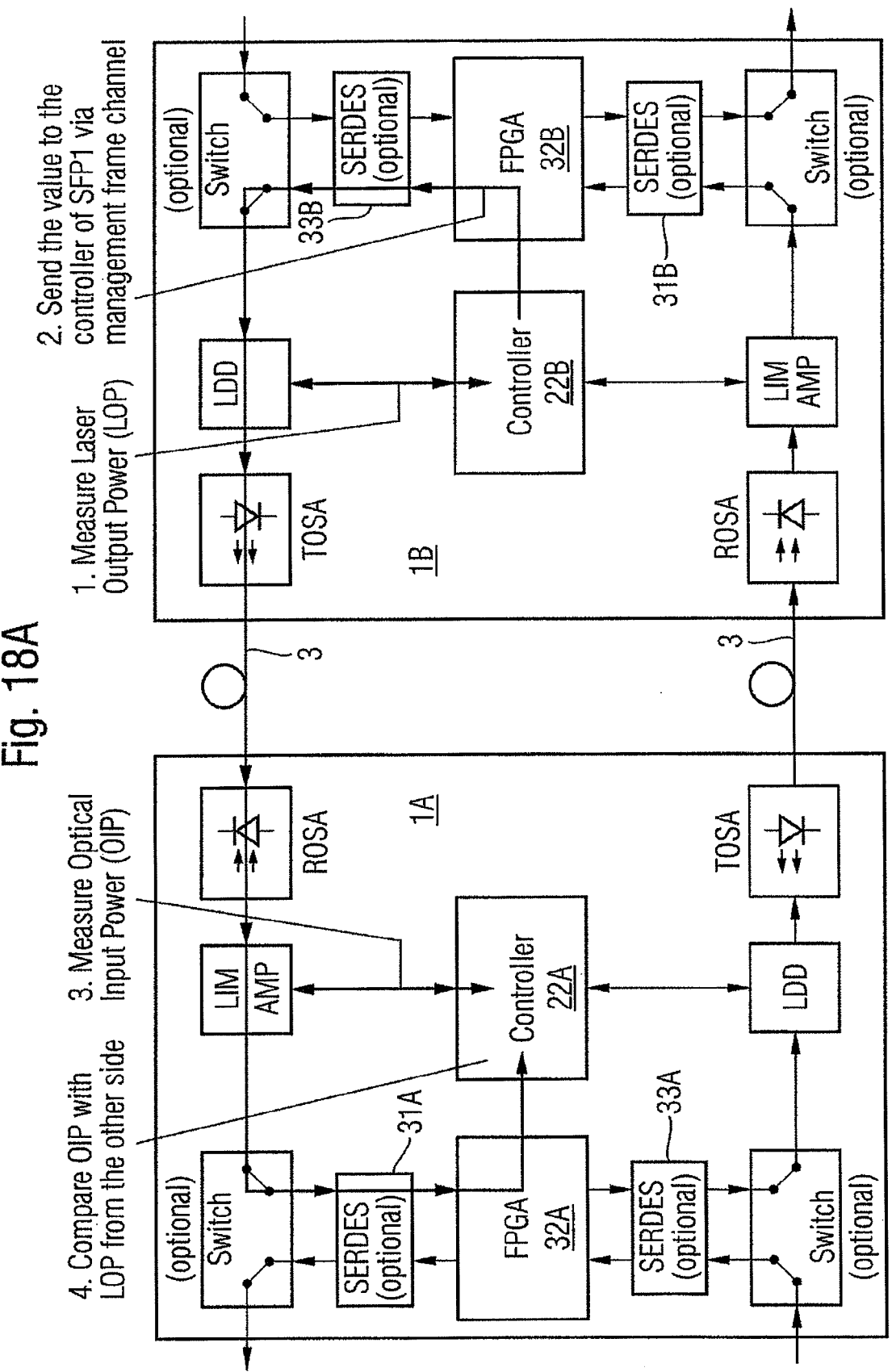
FIGS. 18A, 18B illustrate possibilities of line attenuation measurements performed by the pluggable module according to the present invention.

FIG. 18A illustrates a possibility of a line attenuation measurement which can be performed as performance monitoring by the pluggable module 1 according to the present invention. In the shown embodiment, the communication is performed via a management channel inside of a frame. First, the controller 22B measures the laser output power in the given example. Then the FPGA 32B of the pluggable module 1B sends the measured value of the controller 22B via a management frame channel to the other pluggable module 1A. In a further step, the controller 22A of the pluggable module 1A measures an optical input power (OIP) and compares then the optical input power with the laser output power (LOP) from the other side.

Figure 18B:
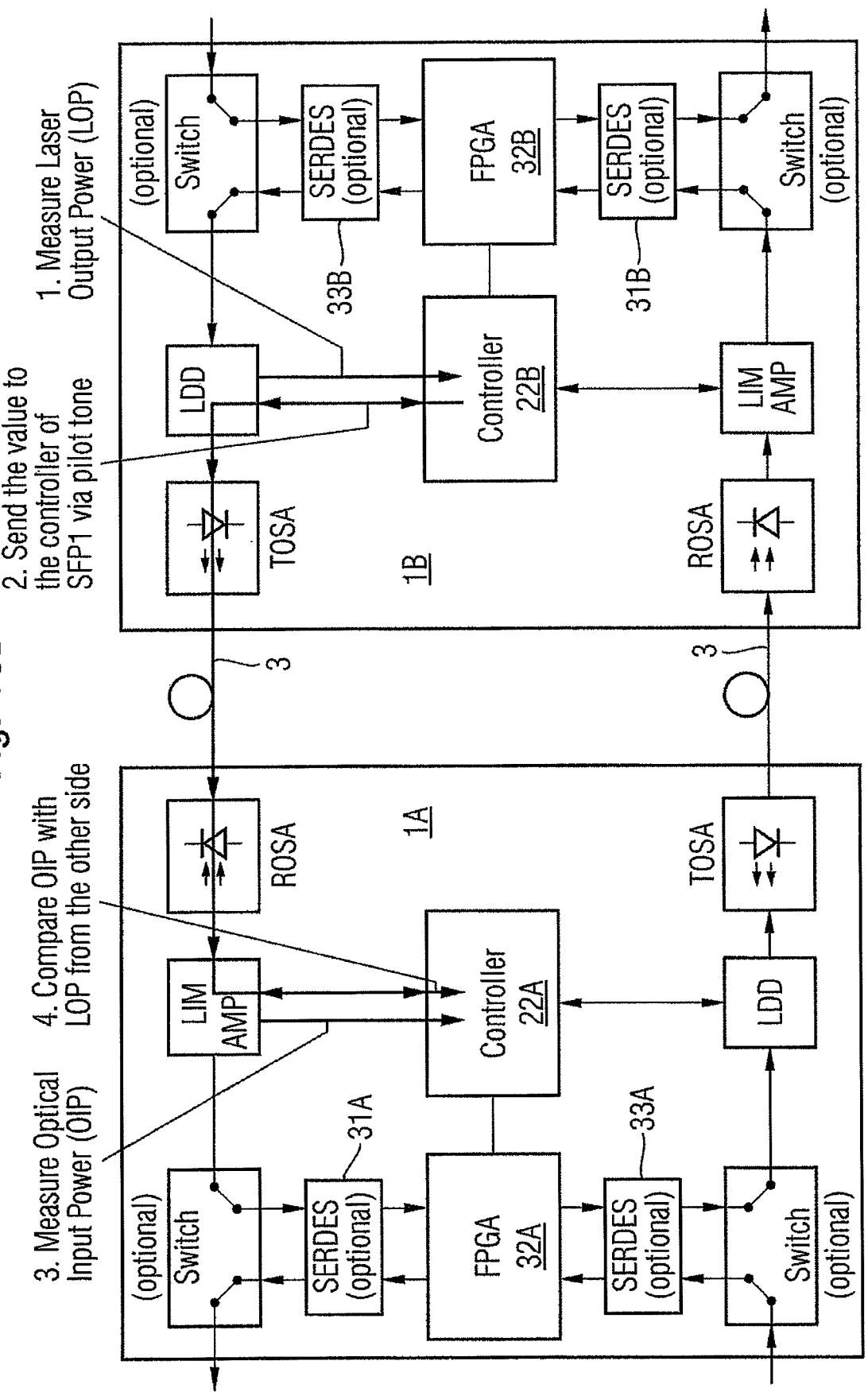

FIG. 18B shows a further possible embodiment for measuring a line attenuation. First, a laser output power (LOP) is measured. Then, the pluggable module 1B sends the measured value of the laser output power (LOP) to the other pluggable module 1A. The pluggable module 1A compares the received value with its optical input power so that the local FPGA 32A can analyze the attenuation of the link. For monitoring the line attenuation, the start value of attenuation (at the start-up of the line first time) can be compared with the current measurement value of attenuation. Now it is possible to calculate a line attenuation for a time and to monitor if sudden changes occur. In an embodiment, a communication is performed via a pilot tone. In an alternative embodiment, the communication is performed via a management channel inside a frame.

Figure 19:
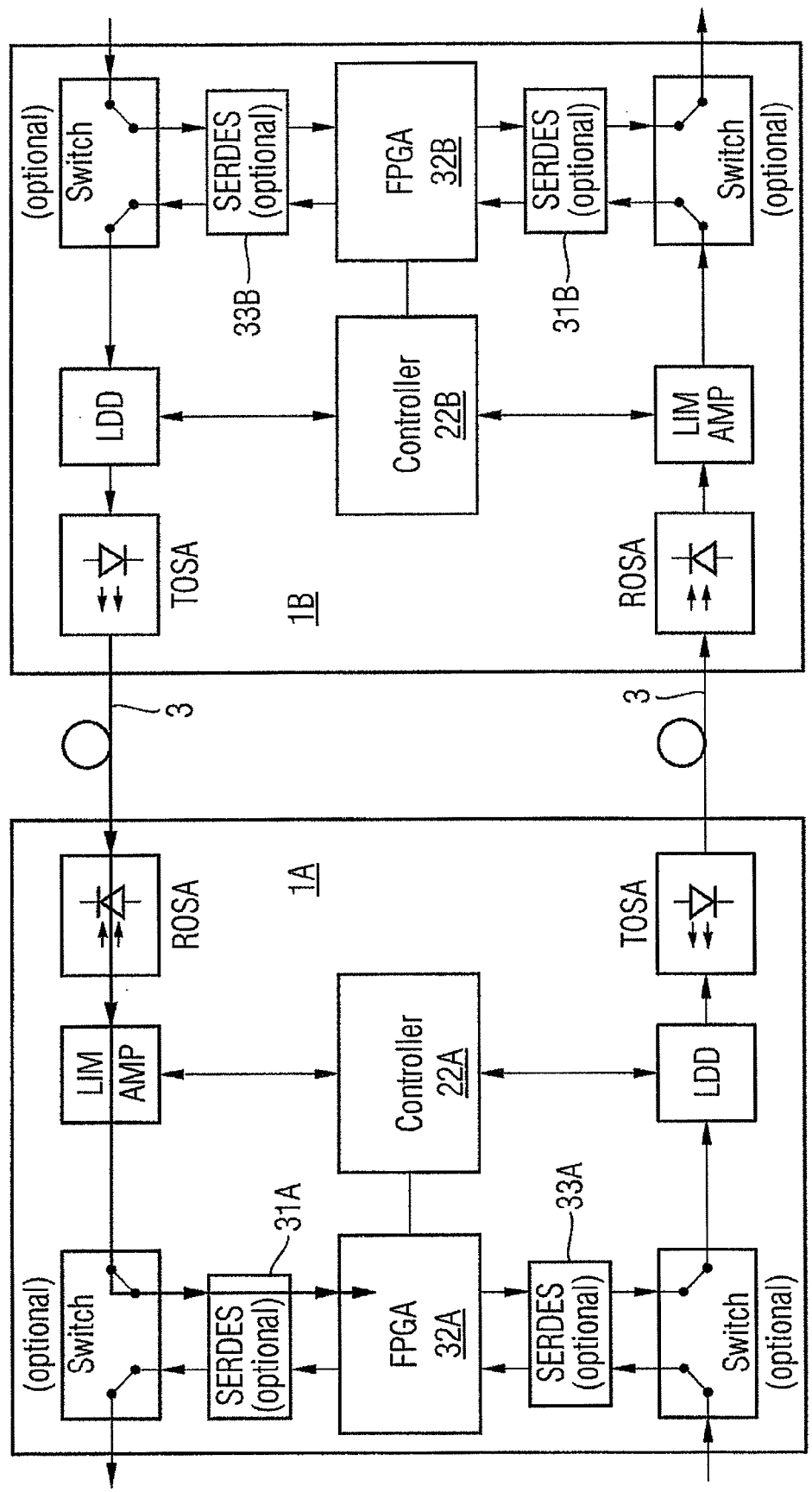
FIGS. 19, 20 illustrate a performance monitoring as performed by the pluggable module according to the present invention.
Figure 20:
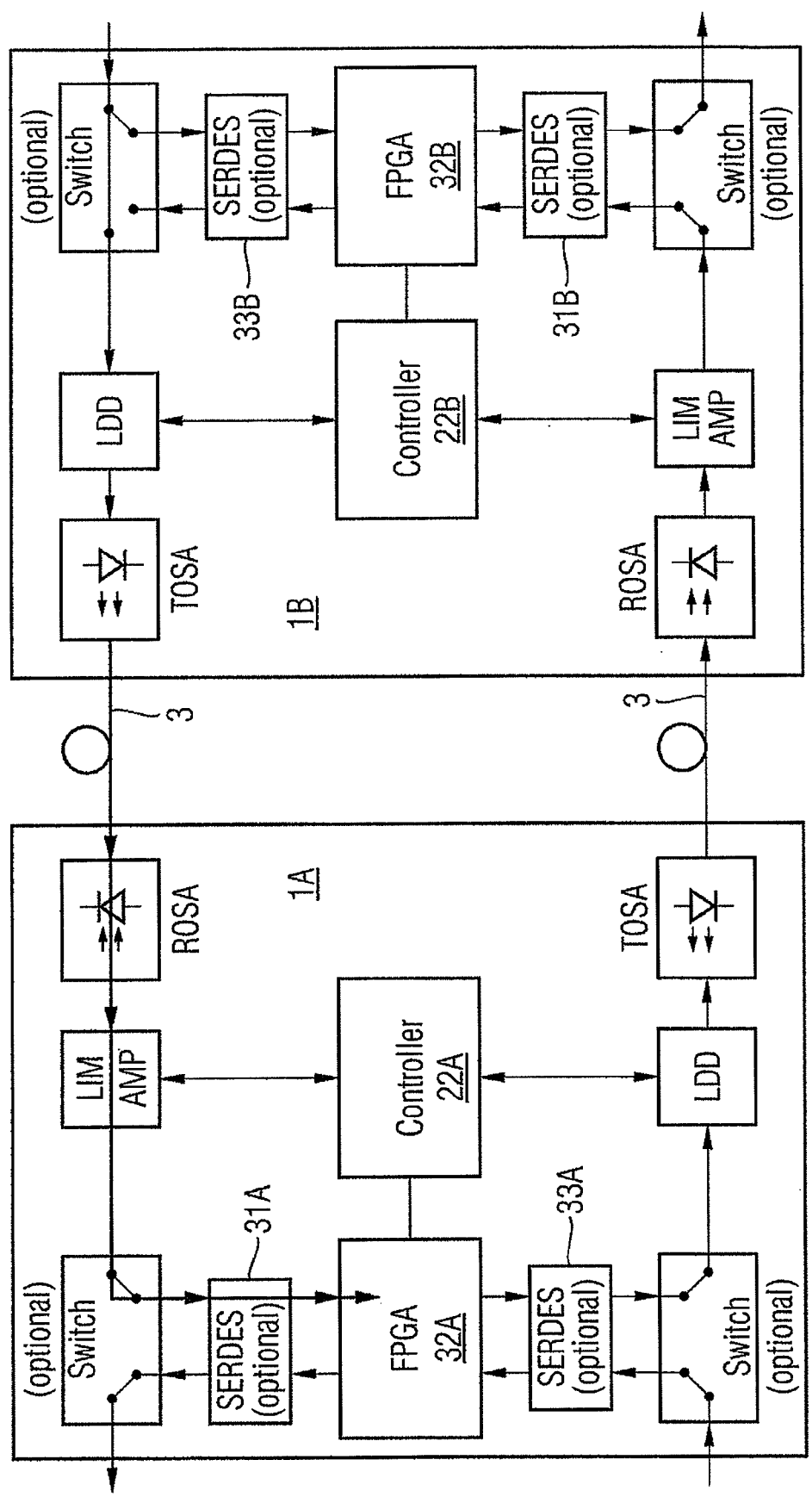

FIGS. 19, 20 illustrate performance monitoring by a pluggable module 1 according to the present invention. The FPGA 32 is provided in the data path for monitoring the data path. The FPGA 32B detects with the help of SERDES various frame properties, such as running disparity, simple disparity, code error or a disparity error.

Figure 21:
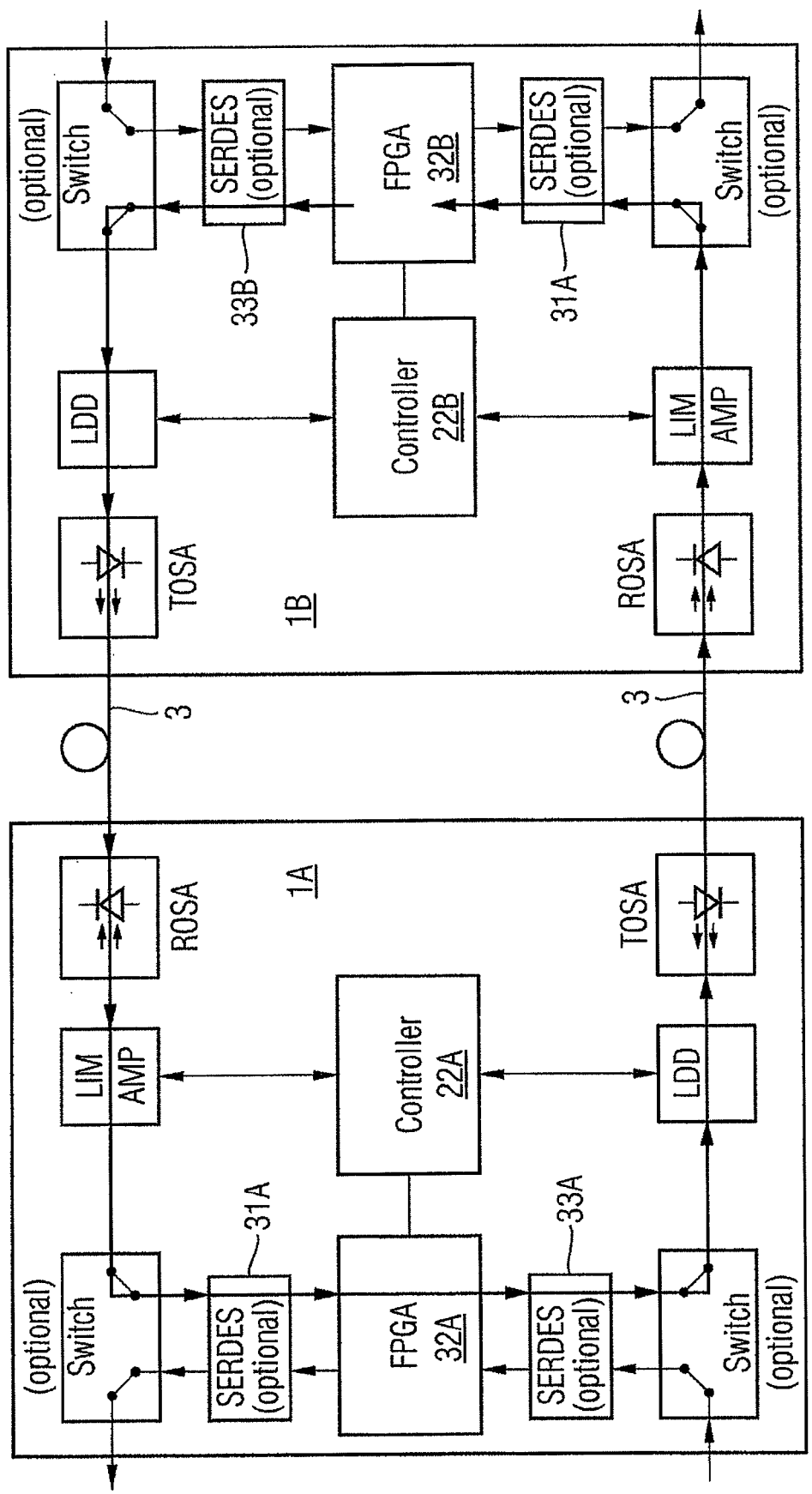
FIG. 21 illustrates a PRBS (Pseudo Random Bit Sequence)-test as performed by a pluggable module according to the present invention.

FIG. 21 illustrates a PRBS (Pseudo Random Bit Sequence) test. In a possible embodiment, the line is analyzed by variation of a PRBS sequence, wherein two various operations can be provided. In a PRBS-loop test as illustrated by FIG. 21, the FPGA 32B of pluggable module 1B sends a PRBS-sequence to the FPGA 32A of the pluggable module 1A. The FPGA 32A of the pluggable module 1A loops the signal. The FPGA 32B of the pluggable module 1B then receives its own PRBS-sequence and can analyze it and can calculate a line quality.

Figure 22:
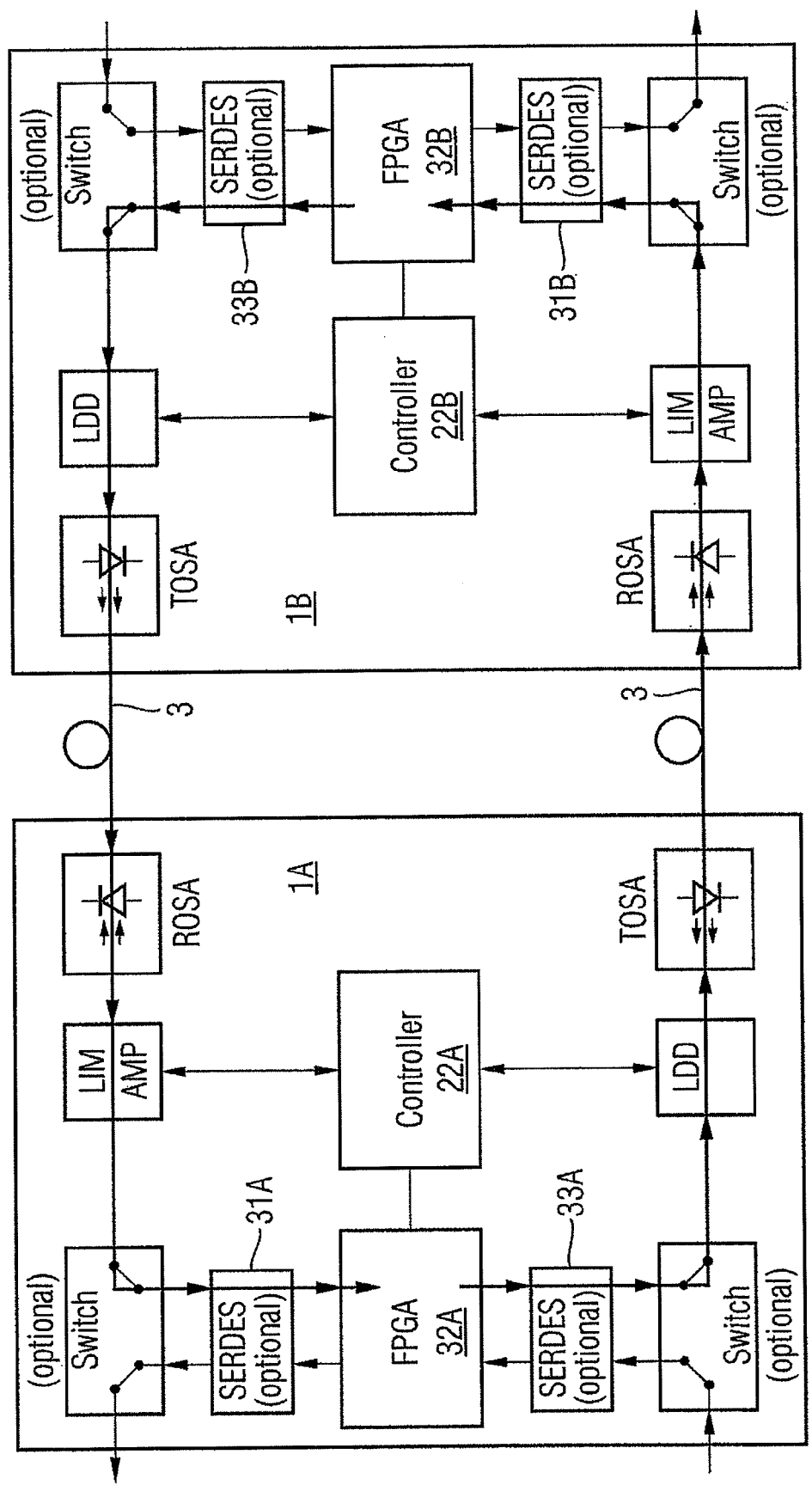
FIG. 22 shows a variant of a PRBS (Pseudo Random Bit Sequence)-test as performed by a pluggable module according to the present invention.
Figure 23:
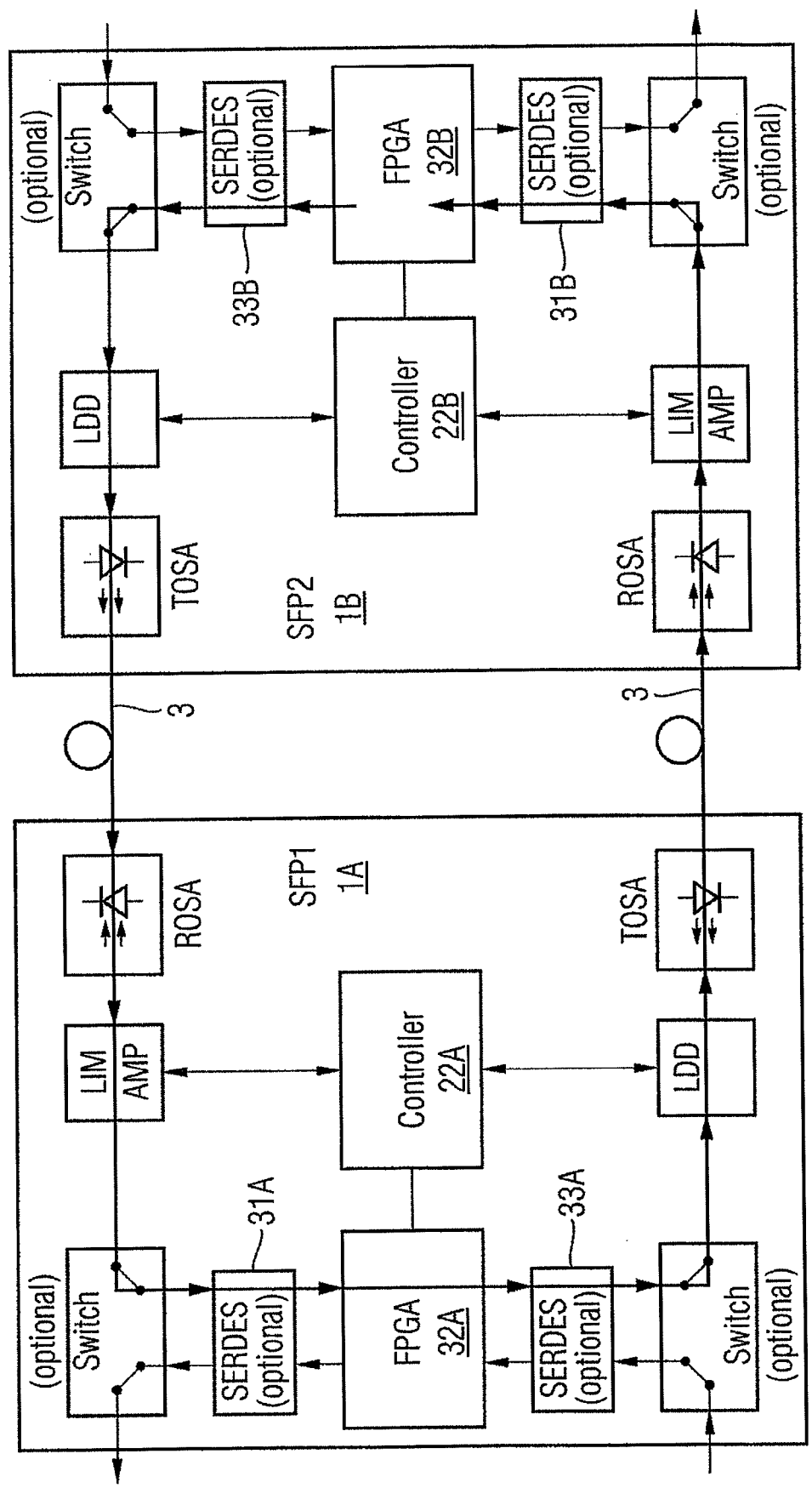
FIG. 23 shows a latency measurement as performed by a pluggable module according to the present invention.

FIG. 22 illustrates a second operation variant for analyzing a line by variation of a PRBS-sequence. In this variant, a separate PRBS-test is performed, i.e. a PRBS-test is performed for each separate line. The FPGA 32A of pluggable module 1A sends a PRBS-sequence to the FPGA 32B of the other pluggable module 1B. Then, the FPGA 32B of pluggable module 1B analyzes the received PRBS-sequence. The same procedure is possible the other way around, i.e. the FPGA 32B of the pluggable module 1B sends the PRBS-sequence to the FPGA 32A of the pluggable module 1A. This is provided for measurements of a line delay (line length). In a line delay loop test FPGA 32B of pluggable module 1B sends a special identifier to the FPGA 32A of the pluggable module 1A. The FPGA 32A of the pluggable module 1A loops the received signal. Then, the FPGA 32B of the second pluggable module 1B receives the special identifier after a line delay time so that it can be analyzed and calculates the line length.

In a possible embodiment, the pluggable module 1 performs a latency measurement of a latency for transporting data from the pluggable module 1 to a far end pluggable module 1'. The measurement can be performed dynamically and without affecting data transmission. In a possible embodiment, the near end pluggable module writes a byte x a time T1 into a signal overhead the far end pluggable module 1 extracts the byte X and writes it to an overhead byte Y at the far end transmitter. The near end pluggable module reads the received byte Y by extracting the T1-time stamp at the time T2. The total delay time is T2−T1. Accordingly, the measured one way latency is T=0.5*(T2−T1).

In a possible embodiment, the latency T is written to the SFF 8472. In an embodiment, the measurement procedure is performed symmetrically, i.e. latency T is available as a dynamical in-service measured parameter at the near end side and at the far end side.

The measurement of the latency T is necessary to fulfil service level agreements (SLA). The latency T sometimes causes protocol buffering to manage protocol throughput, for example in a fibre channel protocol.

In a further embodiment of the pluggable module 1 according to the present invention, the pluggable module 1 performs a link test. A link test is an initialization procedure that takes place before data transmission between host devices 2 is established. A received latency parameter at the far end pluggable module can be evaluated as a link test indication. The purpose of the link test is that it allows to set up and to verify an optical link between two pluggable modules 1 independently from the availability of host data.

In an embodiment of the pluggable module 1 according to the present invention, the pluggable module 1 further performs a protocol mapping between application and transport protocols.

The protocol mapping can comprise payload mapping or overhead mapping. The transport protocols comprise an OTH, Ethernet, SDH or Sonet data transport protocol. In a possible embodiment, the protocol mapping performed by the pluggable module 1 is configurable. In a possible embodiment, the transport protocols comprise OSI-layer 1, OSI-layer 2 and OSI-layer 3 protocols. The protocol mapping allows a bidirectional conversion between different types of protocols, such as Ethernet to SDH.

In a possible embodiment, the data traffic is mapped, i.e. payload mapping, OH-termination. In an alternative embodiment, a management mapping is performed, i.e. a data protocol conversion is performed.

Figure 24:
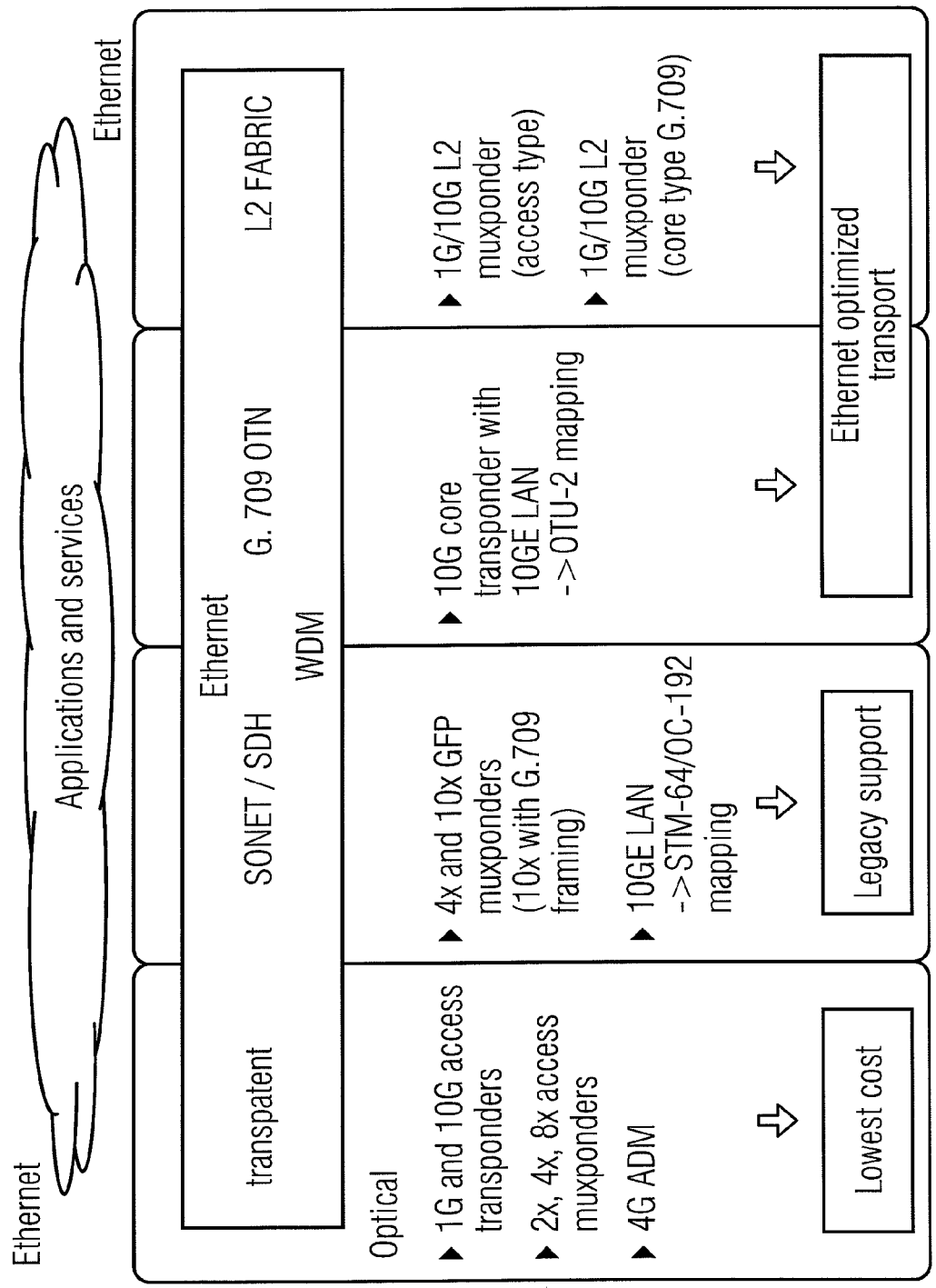
FIG. 24 illustrates an example for protocol mapping performed by a pluggable module according to a possible embodiment of the present invention.

FIG. 24 illustrates an example for protocol mapping as performed by the pluggable module 1.

Figure 25:
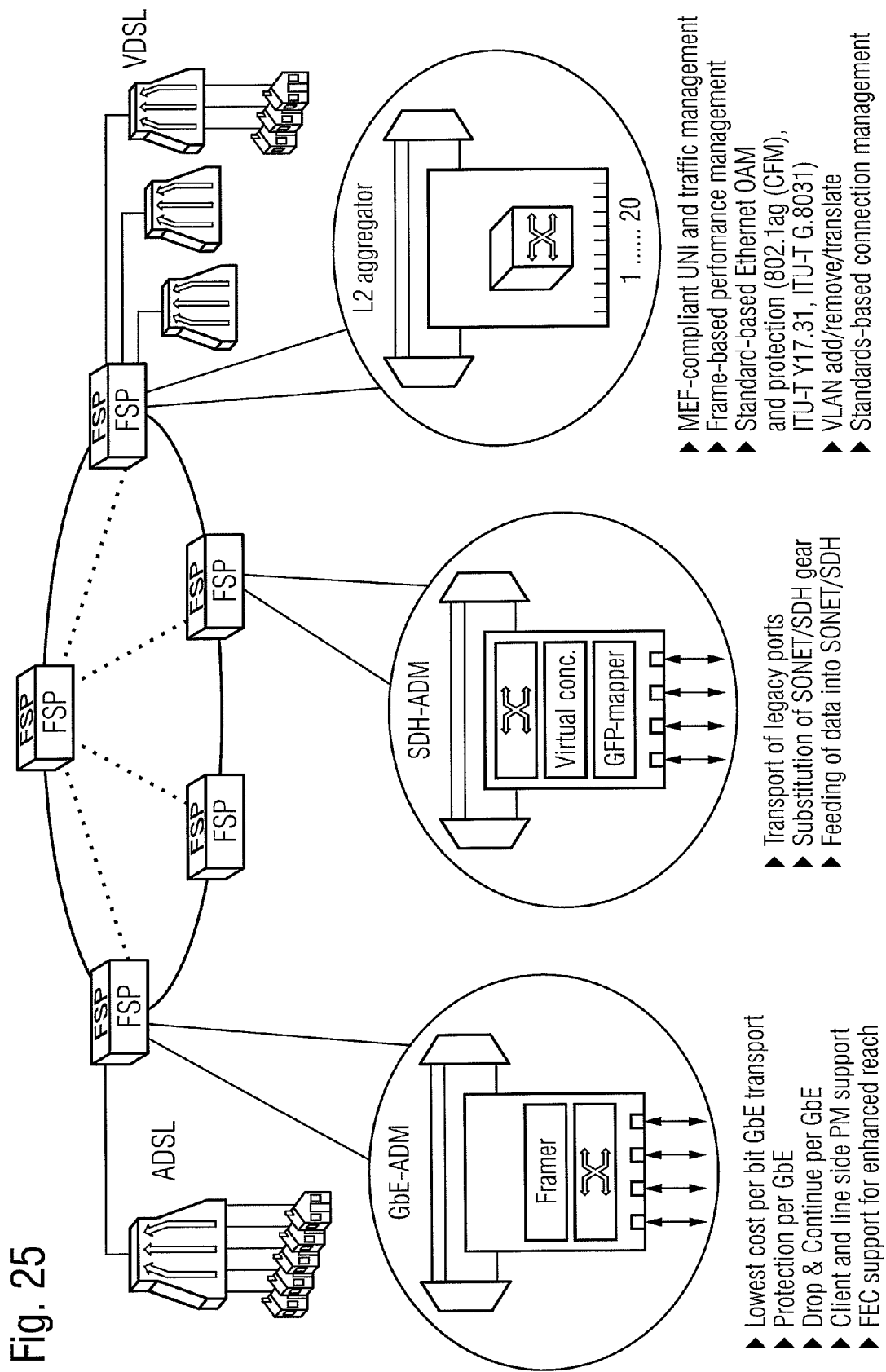
FIG. 25 illustrates possible implementations of protocol mapping functions by a pluggable module according to a possible embodiment of the present invention.

FIG. 25 illustrates possible implementations of protocol mapping functions by the pluggable module 1 according to the present invention.

In a possible embodiment of the pluggable module 1 according to the present invention, the pluggable module 1 further provides a time slot based add/drop functionality between the optical network interface and an electrical host interface.

Figure 26:
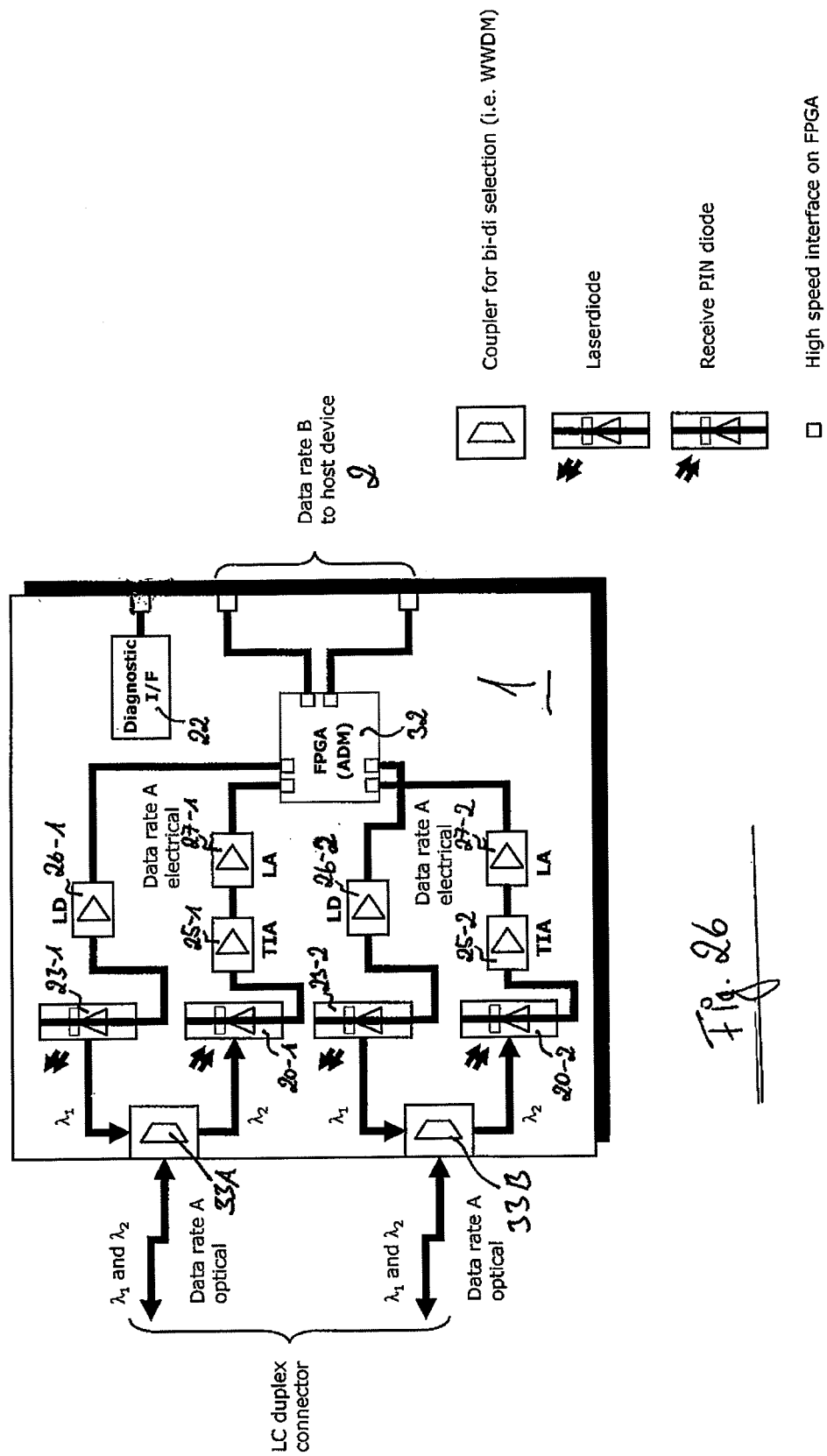
FIG. 26 shows another embodiment of the pluggable module providing single fibre working according to a possible embodiment of the present invention.

In a possible embodiment, the pluggable module 1 provides a single fibre working (SFW) on both interface ports to provide bidirectional east/west communication with an optical network as illustrated by FIG. 26. The add/drop multiplexing (ADM) functionality provided by the pluggable module 1 according to the present invention can be either proprietary or standard conform. ADM always needs east and west interfaces. Conventional pluggable modules offer only a bidirectional interface. With the pluggable module 1 according to the present invention, single fibre working (SFW) is used inside the pluggable module 1 on the existing optical ports of the pluggable module 1. As can be seen from FIG. 26, the pluggable module 1 comprises a multiplexer/demultiplexer 33A, 33B for the optical ports of the pluggable module 1. The couplers 33A, 33B are provided for bi-di selection, i.e. WWDM.

In a preferred embodiment with the ADM as employed by the pluggable module 1 according to the present invention it is possible to configure the ADM-scheme. The configuration can be performed either via the host devices 2 or independently from the host devices 2.

The embedded communication channels ECC allows a host to host communication through the pluggable module 1. The host management interface allows to set up ADM-scheme parameters.

If the configuration is performed independently from the host devices 2, the protocol of the embedded communication channel ECC allows to detect how many pluggable modules (M) share a common bandwidth (B). For fair bandwidth distribution, each pluggable module 1 effectively determines a fractional bandwidth B:M. The embedded communication channel ECC then automatically configures a set of M-pluggable modules 1 of a common network to a bandwidth B:M each.

In a possible embodiment, the ADM employed by the pluggable module 1 according to the present invention performs regeneration. When no bandwidth is terminated inside a node, only a passthrough is regenerated for transmission purposes. A further feature of the ADM as employed by the pluggable module 1 according to the present invention, is protection, i.e. the ability to switch between a bandwidth termination from east and west side in case of a major event. The ADM-functionality of the pluggable module 1 according to the present invention allows to connect host devices 2 in a multiple node network to share a common optical fibre infrastructure.

FIG. 27A illustrates an add/drop from west or east as performed by the pluggable module 1 according to the present invention.

FIG. 27B illustrates a passthrough (regeneration) as performed by the pluggable module 1 according to the present invention.

FIG. 27C illustrates a drop and continue from west or east as employed by the pluggable module 1 according to the present invention.

Those traffic switching functions can be realized within the FPGA 32 of the pluggable module 1. The east/west scenarios as shown in FIGS. 27A and 27C can be provided with optional protection switching. The traffic switching granularity can be a complete data stream (1 GB/sec., 4 GB/sec., 10 GB/sec.) or fractions of the data stream, such as time slots or data packets. A connection in east/west direction based on MSA can be achieved by single fibre working (SFW), i.e. if the transmitting and receiving directions are on the same optical fibre with different wave lengths.

FIGS. 28A, 28B illustrate MSA-compatible optical transceiver with integrated asymmetric Time Division Multiplexing TDM (TDMA) as employed by the pluggable module 1 according to an embodiment of the present invention. The host interface can be formed by a standard IEEE 802.3 interface with reduced net bandwidth (GB Ethernet or fast Ethernet or Ethernet). The FPGA 32 can be provided within the data path. The transceiver network can be either GPON/EPON based or proprietary. The bandwidth/TDMA time slot configuration can be performed via an optional host. TDMA-schemes are well-known, the most important TDMA-schemes are EPON (Ethernet PON) and GPON (Gigabit PON). PON stands for Passive Optical Network. A passive optical network is a point-to-multipoint, fibre-to-the-premises network architecture used to enable a single optical fibre to serve multiple premises. A passive optical network consists of an optical line termination (OLT) at the service provider central office and a number of optical network units (ONU) at the near end user. A PON configuration reduces the amount of fibre and central office equipment required compared to point-to-point architectures.

In order to keep MSA-compliance also on the host interface side 8 of the pluggable module 1 and to avoid the need for host adaptions when supporting the pluggable module 1 according to the present invention, it is preferred to use a standard protocol.

Due to the nature of a TDM-scheme, upstream bandwidth compared to ONU is lower than the total bandwidth in the OLT-node. The TDMA basically maps a continuous data stream into a sequence of transmission time intervals.

A feature of the ADM-scheme as employed by the pluggable module 1 according to the present invention is the capability to configure the ADM-scheme.

In an embodiment of the pluggable module 1, the configuration of the ADM-scheme is performed via host devices 2. An embedded communication channel ECC enables a host-to-host communication through the pluggable module 1. A host management interface allows to set up TDMA-scheme parameters.

In an alternative embodiment, the configuration is performed independently from the host devices 2. In a further embodiment, an embedded communication channel ECC protocol allows to detect how many pluggable modules (M) share a common upstream bandwidth (B). For fair bandwidth distribution each pluggable module 1 gets the allowance to send a fractional bandwidth of size B:M in an upstream direction. The ECC then automatically configures a set of M pluggable modules 1 in a common network to upstream bandwidth B:M each.

The ADM-functionality of the pluggable module 1 according to the present invention allows to connect host devices 2 in a multiple node-star-network according to a so-called PON-structure that shares a common optical fibre infrastructure. The pluggable module 1 according to the present invention, with the TDMA-function allows to connect a plurality of devices over a PON-infrastructure for additional active data transport devices. The host device 2 can comprise a standard transceiver port. The host device 2 receives an Ethernet data stream with a data throughput which is a fraction of the complete Ethernet bandwidth. In a possible embodiment, the configuration of the bandwidth is performed automatically within the TDMA. In an alternative embodiment, the configuration is performed by transferring configuration parameters.

The pluggable module 1 according to the present invention performs in a possible embodiment an optical amplification or optical attenuation, optical test functions and an optical dispersion compensation. With this functionality it is possible to connect host devices 2 in an optical network comprising sophisticated optical functions like wavelength division multiplexing (WDM) over longer distances between termination nodes that require a power level and dispersion management. The pluggable module 1 according to the present invention performs in an embodiment a monitoring and a manipulation of optical signals.

The invention claimed is:

1. A host device in a network for transporting data via at least one optical fibre, the host device comprising an interface card connected to a backplane of said host device,
   wherein said interface card comprises at least one cage for receiving a pluggable module,
   wherein said pluggable module comprises a diagnostic unit which receives local performance data from electronic components of said pluggable module and reports said performance data via an electrical interface to said host device,
   wherein said pluggable module comprises:
      a mapping unit which controls a laser driver depending on the local performance data received from said diagnostic unit to transfer said performance data via an embedded communication channel (ECC) to a far end pluggable module; and
      a de-mapping unit for storing performance data extracted from the embedded communication channel (ECC) in a memory of said diagnostic unit,
   wherein said pluggable module performs a latency measurement of a latency for transporting data from at least one of said pluggable modules to one of a far end pluggable module or to a far end device and a link test, and
   wherein said mapping and de-mapping units are connected to the diagnostic unit.

2. The host device according to claim 1, wherein said electronic components comprise a transmission diode, a receiving diode, a laser driver, a transimpedance amplifier and a limiting or linear amplifier.

3. The host device according to claim 1, wherein said diagnostic unit comprises the memory for storing local performance data of said pluggable module.

4. The host device according to claim 3, wherein said memory is a SFF-8472 memory comprising unallocated bytes used for exchanging DMI (digital monitoring interface) performance data with a far end pluggable module, wherein a second set of an SFF 8472 performance data indicating a performance at the far end is stored in said memory.

5. The host device according to claim 3, wherein the pluggable module performs near end and far end bidirectional performance monitoring and near end and far end digital performance parameters are stored in said memory.

6. The host device according to claim 1, wherein the pluggable module comprises at least one data processing circuit for performing performance monitoring being connected to said diagnostic unit.

7. The host device according to claim 6, wherein said data processing circuit increments at least one performance counter provided in a memory of said diagnostic unit depending on a measured performance indicator, wherein said performance indicator is formed by a BER (bit error rate), measurement—a CV (Coding Violation), a corrected or uncorrected FEC (Forward Error Correction) or by Frame Drops.

8. The host device according to claim 3, wherein said memory of said diagnostic unit is a SFF-8472 memory comprising unallocated bytes used for a ES (error seconds), a SES (severe error seconds) performance counter, a UAS (Unavailable Seconds) performance counter and a BER (Bit Error Rate) performance counter.

9. The host device according to claim 6, wherein said pluggable module comprises a SERDES (serial deserializer) for supplying data from a transmit data path to said data processing circuit and a SERDES for supplying data from a reception data path of said pluggable module to said data processing circuit.

10. A pluggable module for transport of data via at least one optical fibre between host devices,
    wherein said pluggable module comprises a diagnostic unit which receives local performance data from electronic components of said pluggable module and reports said performance data via an electrical interface to said host device,
    wherein said pluggable module comprises:
       a mapping unit which controls a laser driver depending on the local performance data received from said diagnostic unit to transfer said performance data via an embedded communication channel (ECC) to a far end pluggable module; and
       a de-mapping unit for storing performance data extracted from the embedded communication channel (ECC) in a memory of said diagnostic unit,
    wherein said pluggable module performs a latency measurement of a latency for transporting data from at least one of said pluggable modules to one of a far end pluggable module or to a far end device and a link test, and
    wherein said mapping and de-mapping units are connected to the diagnostic unit.

11. The pluggable module of claim 10,
    wherein at least one of said host devices comprises at least one interface card connected to a backplane of said one of said host devices, and
    wherein said interface card comprises at least one cage for receiving the pluggable module.

12. A data transport system for transporting optical data via at least one optical fibre, wherein at both ends of said optical fibre a pluggable module is attached, wherein said pluggable module comprises a diagnostic unit which receives local performance data from electronic components of said pluggable module and reports said performance data via an electrical interface to said host device, wherein said pluggable module comprises:

a mapping unit which controls a laser driver depending on the local performance data received from said diagnostic unit to transfer said performance data via an embedded communication channel (ECC) to a far end pluggable module; and a de-mapping unit for storing performance data extracted from the embedded communication channel (ECC) in a memory of said diagnostic unit, wherein said pluggable module performs a latency measurement of a latency for transporting data from at least one of said pluggable modules to one of a far end pluggable module or to a far end device and a link test, and wherein said mapping and de-mapping units are connected to the diagnostic unit.

13. A method for transport of data between host devices of a network via at least one optical fibre, wherein a pluggable module attached to said optical fibre is connected to a corresponding cage of one of said host devices, wherein said pluggable module comprises a diagnostic unit which receives local performance data from electronic components of said pluggable module and reports said performance data via an electrical interface to said host device, wherein said pluggable module comprises:

a mapping unit which controls a laser driver depending on the local performance data received from said diagnostic unit to transfer said performance data via an embedded communication channel (ECC) to a far end pluggable module; and a de-mapping unit for storing performance data extracted from the embedded communication channel (ECC) in a memory of said diagnostic unit, wherein said pluggable module performs a latency measurement of a latency for transporting data from at least one of said pluggable modules to one of a far end pluggable module or to a far end device and a link test, and wherein said mapping and de-mapping units are connected to the diagnostic unit.

\* \* \* \* \*